US009092825B2

(12) United States Patent
Hansen

(10) Patent No.: US 9,092,825 B2
(45) Date of Patent: Jul. 28, 2015

(54) AUTOMATED SYSTEM FOR ADAPTING MARKET DATA AND EVALUATING THE MARKET VALUE OF ITEMS

(71) Applicant: BuyMetrics, Inc., Atlanta, GA (US)

(72) Inventor: Valerie Hansen, Racine, WI (US)

(73) Assignee: BuyMetrics, Inc., Atlanta, GA (US)

( * ) Notice: Subject to any disclaimer, the term of this patent is extended or adjusted under 35 U.S.C. 154(b) by 0 days.

(21) Appl. No.: 14/262,682

(22) Filed: Apr. 25, 2014

(65) Prior Publication Data

US 2014/0236801 A1 Aug. 21, 2014

Related U.S. Application Data

(63) Continuation of application No. 13/869,942, filed on Apr. 24, 2013, now Pat. No. 8,762,258, which is a continuation of application No. 13/597,200, filed on Aug. 28, 2012, now Pat. No. 8,442,888, which is a (Continued)

(51) Int. Cl.
*G06Q 40/02* (2012.01)
*G06Q 40/04* (2012.01)

(Continued)

(52) U.S. Cl.
CPC .............. *G06Q 40/04* (2013.01); *G06Q 10/087* (2013.01); *G06Q 20/201* (2013.01); *G06Q 30/02* (2013.01); *G06Q 30/0205* (2013.01); *G06Q 30/0206* (2013.01); *G06Q 30/0283* (2013.01); *G06Q 30/04* (2013.01); *G06Q 30/0611* (2013.01); *G06Q 30/0629* (2013.01);

(Continued)

(58) Field of Classification Search
None
See application file for complete search history.

(56) References Cited

U.S. PATENT DOCUMENTS 3,581,072 A 5/1971 Nymeyer
4,412,287 A 10/1983 Braddock, III (Continued)

FOREIGN PATENT DOCUMENTS

EP 0 407 026 A2 1/1991
JP 62-139088 A 6/1987

(Continued)

OTHER PUBLICATIONS

Charles R. Plott and Jared Smith, Instability of equilibria in experimental markets: Upward-sloping demands, externalities, and fad-like incentives, Southern Economic Journal, Jan. 1999, vol. 65, iss. 3.*

(Continued)

*Primary Examiner* — Robert R Niquette
(74) *Attorney, Agent, or Firm* — Seed IP Law Group PLLC

(57) ABSTRACT

A computer system including a service provider server invokes an evaluation service that causes a metric application to obtain a plurality of market transaction data sets responsive to attributes of at least one item identified in a product specification data set and/or a price data set. Each market transaction data set is defined by at least one parameter value and represents market reference price data of a particular time or period of time. At least one adjustment value is generated and applied to the market reference price data associated with the at least one item in one or more of the market transaction data sets, transforming the market reference price data and producing normalized market reference price data sets. A synthetic market value is generated for the at least one item in the product specification data set and/or the price data set, and one or more evaluation metrics generated therefrom are communicated via a network interface.

186 Claims, 13 Drawing Sheets

Related U.S. Application Data continuation of application No. 13/475,900, filed on May 18, 2012, now Pat. No. 8,321,317, which is a continuation of application No. 13/118,351, filed on May 27, 2011, now Pat. No. 8,224,729, which is a continuation of application No. 12/952,083, filed on Nov. 22, 2010, now Pat. No. 7,966,240, which is a continuation of application No. 11/394,540, filed on Mar. 31, 2006, now Pat. No. 7,840,462, which is a continuation of application No. 09/607,502, filed on Jun. 28, 2000, now Pat. No. 7,043,457.

(51) Int. Cl.
*G06Q 10/08* (2012.01)
*G06Q 20/20* (2012.01)
*G06Q 30/02* (2012.01)
*G06Q 30/04* (2012.01)
*G06Q 30/06* (2012.01)
*G06Q 40/00* (2012.01)
*G06Q 40/06* (2012.01)
*G06Q 40/08* (2012.01)
*G06Q 50/16* (2012.01)
*G06Q 50/18* (2012.01)

(52) U.S. Cl.
CPC ............... *G06Q 40/00* (2013.01); *G06Q 40/06* (2013.01); *G06Q 40/08* (2013.01); *G06Q 40/12* (2013.12); *G06Q 50/16* (2013.01); *G06Q 50/188* (2013.01)

(56) References Cited

U.S. PATENT DOCUMENTS

| | | |
|---|---|---|
| 4,486,853 A | 12/1984 | Parsons |
| 4,674,044 A | 6/1987 | Kalmus |
| 4,868,866 A | 9/1989 | Williams, Jr. |
| 4,903,201 A | 2/1990 | Wagner |
| 4,992,940 A | 2/1991 | Dworkin |
| 5,063,506 A | 11/1991 | Brockwell |
| 5,077,665 A | 12/1991 | Silverman |
| 5,101,353 A | 3/1992 | Lupien |
| 5,136,501 A | 8/1992 | Silverman |
| 5,168,446 A | 12/1992 | Wiseman |
| 5,172,314 A | 12/1992 | Poland |
| 5,201,047 A | 4/1993 | Maki et al. |
| 5,249,120 A | 9/1993 | Foley |
| 5,293,479 A | 3/1994 | Quintero |
| 5,297,031 A | 3/1994 | Gutterman |
| 5,375,055 A | 12/1994 | Togher |
| 5,414,621 A | 5/1995 | Hough |
| 5,418,943 A | 5/1995 | Borgida |
| 5,446,874 A | 8/1995 | Waclawsky |
| 5,486,995 A | 1/1996 | Krist |
| 5,500,793 A | 3/1996 | Deming, Jr. |
| 5,675,785 A | 10/1997 | Hall et al. |
| 5,715,402 A | 2/1998 | Popolo |
| 5,726,914 A | 3/1998 | Janovski |
| 5,727,165 A | 3/1998 | Ordish |
| 5,732,271 A | 3/1998 | Berry et al. |
| 5,732,400 A | 3/1998 | Mandler |
| 5,758,328 A | 5/1998 | Giovannoli |
| 5,761,389 A | 6/1998 | Maeda |
| 5,771,370 A | 6/1998 | Klein |
| 5,774,879 A | 6/1998 | Custy |
| 5,794,207 A | 8/1998 | Walker |
| 5,799,300 A | 8/1998 | Agrawal et al. |
| 5,809,483 A | 9/1998 | Broka |
| 5,822,751 A | 10/1998 | Gray et al. |
| 5,835,896 A | 11/1998 | Fisher |
| 5,842,178 A | 11/1998 | Giovannoli |
| 5,845,266 A | 12/1998 | Lupien |
| 5,857,174 A | 1/1999 | Dugan |
| 5,873,069 A | 2/1999 | Reuhl |
| 5,873,071 A | 2/1999 | Ferstenberg |
| 5,924,082 A | 7/1999 | Silverman |
| 5,924,083 A | 7/1999 | Silverman |
| 5,937,393 A | 8/1999 | O'Leary |
| 5,950,176 A | 9/1999 | Keiser |
| 5,960,411 A | 9/1999 | Hartman |
| 5,963,910 A | 10/1999 | Ulwick |
| 5,987,435 A | 11/1999 | Weiss |
| 5,991,696 A | 11/1999 | McAndrew |
| 6,012,046 A | 1/2000 | Lupien |
| 6,023,683 A | 2/2000 | Johnson |
| 6,034,652 A | 3/2000 | Freiberger |
| 6,035,287 A | 3/2000 | Stallaert |
| 6,038,537 A | 3/2000 | Matsuoka |
| 6,038,540 A | 3/2000 | Krist |
| 6,055,516 A | 4/2000 | Johnson |
| 6,055,518 A | 4/2000 | Franklin |
| 6,058,379 A | 5/2000 | Odom |
| 6,061,662 A | 5/2000 | Makivic |
| 6,076,070 A * | 6/2000 | Stack ............................... 705/20 |
| 6,085,164 A | 7/2000 | Smith |
| 6,094,651 A | 7/2000 | Agrawal et al. |
| 6,134,536 A | 10/2000 | Shepherd |
| 6,134,548 A | 10/2000 | Gottsman |
| 6,141,653 A | 10/2000 | Conklin |
| 6,161,103 A | 12/2000 | Rauer et al. |
| 6,163,774 A | 12/2000 | Lore et al. |
| 6,260,024 B1 | 7/2001 | Shkedy |
| 6,278,982 B1 | 8/2001 | Korhammer |
| 6,282,521 B1 | 8/2001 | Howorka |
| 6,311,144 B1 | 10/2001 | Abu El Ata |
| 6,317,728 B1 | 11/2001 | Kane |
| 6,336,105 B1 | 1/2002 | Conklin |
| 6,341,277 B1 | 1/2002 | Coden et al. |
| 6,347,307 B1 | 2/2002 | Sandhu |
| 6,381,605 B1 | 4/2002 | Kothuri et al. |
| 6,389,407 B1 | 5/2002 | Paradis |
| 6,408,282 B1 | 6/2002 | Buist |
| 6,411,936 B1 | 6/2002 | Sanders |
| 6,415,263 B1 | 7/2002 | Doss |
| 6,460,020 B1 | 10/2002 | Pool |
| 6,477,536 B1 | 11/2002 | Pasumansky et al. |
| 6,505,172 B1 | 1/2003 | Johnson |
| 6,505,174 B1 | 1/2003 | Keiser |
| 6,510,434 B1 | 1/2003 | Anderson |
| 6,535,880 B1 | 3/2003 | Musgrove |
| 6,553,346 B1 | 4/2003 | Walker |
| 6,556,976 B1 | 4/2003 | Callen |
| 6,564,192 B1 | 5/2003 | Kinney, Jr. |
| 6,609,098 B1 | 8/2003 | DeMarcken |
| 6,618,707 B1 | 9/2003 | Gary |
| 6,629,082 B1 | 9/2003 | Hambrecht |
| 6,654,747 B1 | 11/2003 | Van Huben et al. |
| 6,662,174 B2 | 12/2003 | Shah et al. |
| 6,677,963 B1 | 1/2004 | Mani |
| 6,714,933 B2 | 3/2004 | Musgrove |
| 6,778,863 B1 | 8/2004 | Lienhard |
| 6,847,938 B1 | 1/2005 | Moore |
| 6,850,900 B1 | 2/2005 | Hare |
| 6,856,967 B1 | 2/2005 | Woolston |
| 6,907,404 B1 | 6/2005 | Li |
| 6,941,280 B1 | 9/2005 | Gastineau |
| 6,963,854 B1 * | 11/2005 | Boyd et al. ..................... 705/37 |
| 6,976,006 B1 | 12/2005 | Verma |
| 6,990,238 B1 | 1/2006 | Saffer |
| 6,993,504 B1 | 1/2006 | Friesen |
| 7,010,494 B2 | 3/2006 | Etzioni |
| 7,010,511 B1 | 3/2006 | Kinney, Jr. |
| 7,024,376 B1 | 4/2006 | Yuen |
| 7,031,901 B2 | 4/2006 | Abu El Ata |
| 7,043,457 B1 | 5/2006 | Hansen |
| 7,058,598 B1 | 6/2006 | Chen |
| 7,072,857 B1 | 7/2006 | Calonge |
| 7,080,033 B2 | 7/2006 | Wilton |
| 7,107,230 B1 | 9/2006 | Halbert |
| 7,113,919 B1 | 9/2006 | Norris |
| 7,124,106 B1 | 10/2006 | Stallaert |
| 7,133,835 B1 | 11/2006 | Fusz |

(56) References Cited

U.S. PATENT DOCUMENTS

| | | |
|---|---|---|
| 7,133,848 B2 | 11/2006 | Phillips |
| 7,149,717 B1 * | 12/2006 | Kan .................................. 705/37 |
| 7,165,042 B1 | 1/2007 | Segal |
| 7,181,424 B1 | 2/2007 | Ketchum |
| 7,203,661 B1 | 4/2007 | Graff |
| 7,206,756 B1 | 4/2007 | Walsky |
| 7,212,996 B1 | 5/2007 | Carnahan |
| 7,212,997 B1 | 5/2007 | Pine |
| 7,212,999 B2 | 5/2007 | Friesen |
| 7,225,150 B2 | 5/2007 | Wilton |
| 7,231,612 B1 | 6/2007 | Mani |
| 7,246,092 B1 | 7/2007 | Peterson |
| 7,249,085 B1 | 7/2007 | Kinney, Jr. |
| 7,283,979 B2 | 10/2007 | Tulloch |
| 7,346,574 B2 | 3/2008 | Smith |
| 7,373,317 B1 | 5/2008 | Kopelman |
| 7,373,319 B2 | 5/2008 | Kopelman |
| 7,379,898 B2 | 5/2008 | Tenorio |
| 7,383,206 B2 | 6/2008 | Rupp |
| 7,386,497 B1 | 6/2008 | Gooch |
| 7,389,211 B2 | 6/2008 | Abu El Ata |
| 7,392,214 B1 | 6/2008 | Fraser |
| 7,424,452 B2 | 9/2008 | Feilbogen |
| 7,430,531 B1 | 9/2008 | Snyder |
| 7,447,653 B1 | 11/2008 | Watanabe |
| 7,467,110 B2 | 12/2008 | Müller |
| 7,509,261 B1 | 3/2009 | McManus |
| 7,509,283 B2 | 3/2009 | Friesen |
| 7,552,095 B2 | 6/2009 | Kalyan |
| 7,562,047 B2 | 7/2009 | Friesen |
| 7,577,582 B1 | 8/2009 | Ojha |
| 7,577,606 B1 | 8/2009 | Ford |
| 7,584,144 B2 | 9/2009 | Friesen |
| 7,603,286 B2 | 10/2009 | Ouimet |
| 7,653,583 B1 | 1/2010 | Leeb |
| 7,660,738 B1 | 2/2010 | Siegel |
| 7,680,723 B2 | 3/2010 | Friesen |
| 7,684,144 B1 | 3/2010 | Goker |
| 7,685,048 B1 | 3/2010 | Hausman |
| 7,689,495 B1 | 3/2010 | Kim |
| 7,702,615 B1 | 4/2010 | Delurgio |
| 7,725,358 B1 | 5/2010 | Brown |
| 7,725,383 B2 | 5/2010 | Wilton |
| 7,742,934 B2 | 6/2010 | Offutt, Jr. |
| 7,752,122 B2 | 7/2010 | Friesen |
| 7,765,140 B1 | 7/2010 | Megiddo |
| 7,769,612 B1 | 8/2010 | Walker |
| 7,835,970 B1 | 11/2010 | Marchegiani |
| 7,840,476 B1 | 11/2010 | Zack |
| 7,958,013 B2 | 6/2011 | Porat |
| 7,970,713 B1 | 6/2011 | Gorelik |
| 8,005,684 B1 | 8/2011 | Cheng |
| 8,150,735 B2 | 4/2012 | Walker |
| 8,229,831 B2 | 7/2012 | Fraser |
| 8,326,697 B2 | 12/2012 | Kopelman |
| 8,554,659 B2 | 10/2013 | Annunziata |
| 8,688,564 B2 | 4/2014 | Friesen |
| 8,768,824 B2 | 7/2014 | Friesen |
| 2001/0032116 A1 | 10/2001 | Hyatt |
| 2001/0032163 A1 | 10/2001 | Fertik |
| 2001/0032171 A1 * | 10/2001 | Brink et al. .................... 705/37 |
| 2002/0007324 A1 | 1/2002 | Centner |
| 2002/0010663 A1 | 1/2002 | Muller |
| 2002/0019794 A1 | 2/2002 | Katz |
| 2002/0026403 A1 | 2/2002 | Tambay |
| 2002/0026630 A1 | 2/2002 | Schmidt |
| 2002/0069134 A1 | 6/2002 | Solomon |
| 2002/0111873 A1 | 8/2002 | Ehrlich |
| 2002/0152135 A1 | 10/2002 | Beeri |
| 2002/0156685 A1 | 10/2002 | Ehrlich |
| 2003/0065586 A1 | 4/2003 | Shaftel |
| 2003/0093343 A1 | 5/2003 | Huttenlocher |
| 2003/0097328 A1 | 5/2003 | Lundberg |
| 2003/0233305 A1 | 12/2003 | Solomon |
| 2004/0015415 A1 * | 1/2004 | Cofino et al. .................. 705/26 |
| 2005/0010494 A1 | 1/2005 | Mourad |
| 2005/0021366 A1 * | 1/2005 | Pool et al. ....................... 705/1 |
| 2006/0015413 A1 * | 1/2006 | Giovannoli .................... 705/26 |
| 2006/0253334 A1 | 11/2006 | Fukasawa |
| 2007/0250431 A1 | 10/2007 | Olof-Ors |
| 2008/0071638 A1 | 3/2008 | Wanker |
| 2008/0077542 A1 | 3/2008 | McElhiney |
| 2008/0270221 A1 | 10/2008 | Clemens |
| 2009/0083120 A1 | 3/2009 | Strichman |
| 2009/0138411 A1 | 5/2009 | O'Callahan |
| 2010/0023379 A1 | 1/2010 | Rappaport |
| 2010/0082419 A1 | 4/2010 | Au-Yeung |
| 2010/0185554 A1 | 7/2010 | Sivasundaram |

FOREIGN PATENT DOCUMENTS

| | | | |
|---|---|---|---|
| WO | 96/08783 | A1 | 3/1996 |
| WO | 97/31322 | A1 | 8/1997 |
| WO | 00/16232 | A1 | 3/2000 |
| WO | 01/63521 | A2 | 8/2001 |

OTHER PUBLICATIONS

Böer, G., and J. Ettlie, "Target Costing Can Boost Your Bottom Line," Strategic Finance 81(1):49-52, Jul. 1999.

Lovelock C.H., and G.S. Yip, "Developing Global Strategies for Service Businesses," California Management Review 38(2):64-86, Winter 1996.

O'Brien, T., "A Day at the Park Costs More Than Ever," Amusement Business 108(25):3-5, Jun. 1996.

Plotkin, D., "Business Rules Everywhere, Part 2," Intelligent Enterprise 2(10):42-48, Jul. 1999.

Plott, C.R., and J. Smith, "Instability of Equilibria in Experimental Markets: Upward-Sloping Demands, Externalities, and Fad-Like Incentives," Southern Economic Journal 65(3):405-426, 1999.

Burke, "The Effects of Missing Information on Decision Strategy Selection," *Advances in Consumer Research* 17:250-256, 1990.

Mantel et al., "The Role of Direction of Comparison, Attribute-Based Processing, and Attitude-Based Processing in Consumer Preference," *Journal of Consumer Research* 25:335-352, Mar. 1999.

* cited by examiner

FILE EDIT VIEW FAVORITES TOOLS HELP

BACK FORWARD STOP REFRESH HOME SEARCH FAVORITES HISTORY MAIL SIZE PRINT

ADDRESS http://www.probuild.com/buymetrics/SoftwoodTally.asp?MetricID=194$Action=FromSummary

LINKS >> http://www.probuild.com/buymetrics/SoftwoodTally.asp?MetricID=194$Action=FromSummary New Softwood RFQ | List Open Softwoods RFQs | List Submitted Softwoods RFQs | List Closed Softwoods RFQs | Tally Calculator - Manager
New Panel RFQ | List Open Panels RFQs | List Submitted Panels RFQs | List Closed Panels RFQs
New Program and Buy RFQ | List Unsolicited Offers Lumber Type:
2 x 4 WSPF 2&B
2 x 6 WSPF 2&B
2 x 4 ESPF 2&B Boston
2 x 8 WSPF 2&B
2 x 10 WSPF 2&B Calculate

| PCS Per Unit: | Price/M | Lumber Dimension: | Freight: | Metric $/M: | Quote $/Metric $ |
|---|---|---|---|---|---|
| 294 | 322 | 2 x 4 | | 331.791 | 0.970490 |

| Length | Qty | PCS | Piece | BF Total | Invoice Cost | Price | Spec Cost | Adj Cost | Metric $/M | Adj Piece Cost | Total: |
|---|---|---|---|---|---|---|---|---|---|---|---|
| 8 | 4 | 1176 | 5.3333 | 6272 | 2019.584 | 220 | 1881.6 | 1826.075 | 291.147 | 1.553 | 1826.328 |
| 10 | 4 | 1176 | 6.6667 | 7840 | 2524.48 | 225 | 2391.2 | 2320.636 | 295.999 | 1.973 | 2320.248 |
| 12 | 6 | 1764 | 8 | 14112 | 4544.064 | 220 | 4233.6 | 4108.668 | 291.147 | 2.329 | 4108.356 |
| 14 | 2 | 588 | 9.3333 | 5488 | 1767.136 | 260 | 1865.92 | 1810.857 | 329.967 | 3.08 | 1811.04 |
| 16 | 6 | 1764 | 10.6667 | 18816 | 6058.752 | 295 | 7056 | 6847.78 | 363.934 | 3.882 | 6847.848 |
| 18 | | 0 | 12 | | | 285 | | | | | |
| 20 | | 0 | 13.3333 | | | 285 | | | | | |
| TOTALS | 22 | 6468 | | 52528 | 16914.016 | | 17428.32 | 16914.016 | | | 16913.82 |

AUTOMATED SYSTEM FOR ADAPTING MARKET DATA AND EVALUATING THE MARKET VALUE OF ITEMS

FIELD

This present disclosure generally relates to electronic commerce software applications and, more particularly, to evaluating prices and transactions for purchasing.

BACKGROUND

Commodity items such as lumber, agricultural products, metals, and livestock/meat are usually traded in the open market between a number of buyers and sellers. The sales transactions of most commodity items involve a number of parameters. For instance, in the trade of commodity lumber, a buyer usually orders materials by specifying parameters such as lumber species, grade, size (i.e., 2×4, 2×10, etc.), and length, as well as the "tally" or mix of units of various lengths within the shipment, method of transportation (i.e., rail or truck), shipping terms (i.e., FOB or delivered), and desired date of receipt, with each parameter influencing the value of the commodity purchase. Given the multiple possible combinations of factors, a commodity buyer often finds it difficult to objectively compare similar but unequal offerings among competing vendors.

For example, in a case where a lumber buyer desires to order a railcar load of spruce (SPF) 2×4's of #2 & Better grade, the buyer would query vendors offering matching species and grade carloads seeking the best match for the buyer's need or tally preference at the lowest market price. Lumber carloads are quoted at a price per thousand board feet for all material on the railcar. In a market where the shipping parameters are not identical, it is very difficult for buyers to determine the comparative value of unequal offerings.

Typically, a lumber buyer will find multiple vendors each having different offerings available. For example, a railcar of SPF 2×4's may be quoted at a rate of $300/MBF (thousand board feet) by multiple vendors. Even though the MBF price is equal, one vendor's carload may represent significantly greater marketplace value because it contains the more desirable lengths of 2×4's, such as market-preferred 16-foot 2×4's. When the offering price varies in addition to the mix of lengths, it becomes increasingly difficult to compare quotes from various vendors. Further, because construction projects often require long lead times, the lumber product may need to be priced now, but not delivered until a time in the future. Alternately, another species of lumber (i.e., southern pine) may represent an acceptable substitute.

Therefore, from the foregoing, there is a need for a method and system that allows buyers to evaluate the price of commodity offerings possessing varying shipping parameters.

SUMMARY

Described herein is a computing system that operates in a networked service provider environment. In at least one aspect, the computing system comprises a service provider server that includes a network interface, a memory storing computer-readable instructions, and a processor in communication with the network interface and the memory. The processor is configured to execute the computer-readable instructions stored in the memory.

A metric manager executable by the processor is programmed to manage at least one evaluation service and a plurality of predefined instructions for adapting metric data. A metric application operable in coordination with the metric manager is programmed to coordinate invocation of the at least one evaluation service including execution of one or more predefined instructions for adapting metric data that pertain to a user-agent and the at least one evaluation service. The metric application is further programmed to manage one or more interfaces that facilitate communications with the service provider server.

In at least one aspect, the metric application is further programmed to receive, from a user-agent via a remotely located user-agent computing device, one or more product specification data sets, wherein each product specification data set identifies at least one item that is defined by two or more parameter values, or a plurality of items that differ in accordance with at least one parameter value, and for at least one item identified in a received product specification data set, invoke the at least one evaluation service to automatically generate one or more evaluation metrics for the item.

Invoking the at least one evaluation service causes the metric application to obtain metric data from at least one database or data source accessible to the processor. The metric data comprises a plurality of market transaction data sets responsive to attributes of the at least one item identified in the product specification data set, wherein each market transaction data set is defined by at least one parameter value and represents market reference price data associated with the at least one item at a particular time or period of time. At least one item represented in at least one of the plurality of market transaction data sets differs by one or more parameter values from the at least one item identified in the product specification data set.

Invoking the at least one evaluation service further causes the metric application to execute one or more predefined instructions for adapting metric data that pertain to the at least one evaluation service, as applicable to each of the market transaction data sets. Execution of the one or more predefined instructions causes at least one adjustment value to be generated and applied to the market reference price data associated with the at least one item as represented in one or more of the market transaction data sets that differ by at least one parameter value from the at least one item identified in the product specification data set, transforming the market reference price data associated with the at least one item and producing a plurality of normalized market reference price data sets for the at least one item identified in the product specification data set.

At least one synthetic market value is generated for the at least one item identified in the product specification data set. The market reference price data of the plurality of normalized market reference price data sets are input into at least one predefined algorithm associated with the at least one evaluation service to generate the at least one synthetic market value. One or more evaluation metrics for the at least one item identified in the product specification data set are generated based at least in part on the at least one synthetic market value. The metric application is further programmed to manage at least one interface to communicate, via the network interface, the one or more evaluation metrics to at least the remotely located user-agent computing device from which the product specification data set was received.

In another aspect of the present disclosure, the metric application is programmed to receive, from a buyer-agent via a remotely located buyer-agent computing device, one or more product specification data sets, wherein each product specification data set identifies at least one item that is defined by two or more parameter values, or a plurality of items that differ in accordance with at least one parameter value, and to receive a plurality of price data sets responsive to at least one item identified in the product specification data set, wherein each price data set includes price data representing an offer and identifies at least one item that is defined by one or more parameter values. For each received price data set, the metric application is programmed to invoke the at least one evaluation service to automatically generate one or more evaluation metrics for the at least one item identified in the price data set.

Invoking the at least one evaluation service causes the metric application to obtain metric data from at least one database or data source accessible to the processor, wherein the metric data comprises a plurality of market transaction data sets responsive to attributes of the at least one item identified in the price data set. Each market transaction data set is defined by at least one parameter value and represents market reference price data associated with at least one item at a particular time or period of time. At least one item represented in the plurality of market transaction data sets differs by one or more parameter values from the at least one item identified in the price data set.

Invoking the at least one evaluation service further causes the metric application to execute one or more predefined instructions for adapting metric data that pertain to the at least one evaluation service, as applicable to each of the market transaction data sets. Execution of the one or more predefined instructions causes at least one adjustment value to be generated and applied to the market reference price data associated with the at least one item represented in one or more of the market transaction data sets that differ by at least one parameter value from the at least one item identified in the price data set, transforming the market reference price data associated with the at least one item, and producing a plurality of normalized market reference price data sets for the at least one item identified in the price data set.

At least one synthetic market value for the at least one item identified in the price data set is generated. The market reference price data of the plurality of normalized market reference price data sets are input into at least one predefined algorithm associated with the at least one evaluation service to generate the at least one synthetic market value, and one or more evaluation metrics for the at least one item identified in the price data set are generated based at least in part on the at least one synthetic market value.

The metric application is further programmed to manage at least one interface to communicate, via the network interface, for comparison, at least a subset of the received price data sets and the one or more evaluation metrics generated for the at least one item identified in the respective price data sets to at least the remotely located buyer-agent computing device from which the product specification data set was received.

In yet another aspect of the present disclosure, the metric application is programmed to receive, from a buyer-agent via a remotely located buyer-agent computing device, one or more product specification data sets, wherein each product specification data set identifies at least one item that is defined by two or more parameter values, or a plurality of items that differ in accordance with at least one parameter value, and to receive one or more price data sets responsive to at least one item identified in the product specification data sets. Each price data set includes price data representing an offer and identifies at least one item that is defined by one or more parameter values.

For at least one item identified in at least one product specification data set and identified in at least one responsive price data set, the metric application is further programmed to invoke the at least one evaluation service to automatically generate one or more evaluation metrics for the item identified in the product specification data set.

Invoking the at least one evaluation service causes the metric application to obtain metric data from at least one database or data source accessible to the processor. The metric data comprises a plurality of market transaction data sets responsive to attributes of the at least one item identified in the product specification data set. Each market transaction data set is defined by at least one parameter value and represents market reference price data associated with the at least one item at a particular time or period of time. At least one item represented in the plurality of market transaction data sets differs by one or more parameter values from the at least one item identified in the product specification data set.

Invoking the at least one evaluation service further causes the metric application to execute one or more predefined instructions for adapting metric data that pertain to the at least one evaluation service, as applicable to each of the market transaction data sets. Execution of the one or more predefined instructions causes at least one adjustment value to be generated and applied to the market reference price data associated with the at least one item as represented in one or more of the market transaction data sets that differ by at least one parameter value from the at least one item identified in the product specification data set, transforming the market reference price data associated with the at least one item, and producing a plurality of normalized market reference price data sets for the at least one item identified in the product specification data set. At least one synthetic market value for the at least one item identified in the product specification data set is generated. The market reference price data of the plurality of normalized market reference price data sets are input into at least one predefined algorithm associated with the at least one evaluation service to generate the at least one synthetic market value. Further, one or more evaluation metrics for the at least one item identified in the product specification data set are generated based at least in part on the at least one synthetic market value.

The metric application is further programmed to, for at least one item identified in the at least one product specification data set and identified in the at least one responsive price data set, invoke the at least one evaluation service to automatically generate one or more evaluation metrics for the item as identified in each price data set. Invoking the at least one evaluation service causes the metric application to obtain metric data from at least one database or data source accessible to the processor, wherein the metric data comprises a plurality of market transaction data sets responsive to attributes of the at least one item identified in the price data set, wherein each market transaction data set is defined by at least one parameter value and represents market reference price data associated with the at least one item at a particular time or period of time, and wherein at least one item represented in the plurality of market transaction data sets differs by one or more parameter values from the at least one item identified in the price data set. Execution of one or more predefined instructions for adapting metric data that pertain to the at least one evaluation service, as applicable to each of the market transaction data sets, causes at least one adjustment value to be generated and applied to the market reference price data associated with the at least one item as represented in one or more of the market transaction data sets that differ by at least one parameter value from the at least one item identified in the price data set, transforming the market reference price data associated with the at least one item and producing a plurality of normalized market reference price data sets for the at least one item identified in the price data set.

At least one synthetic market value for the at least one item identified in the price data set is generated. The market reference price data of the plurality of normalized market reference price data sets are input into at least one predefined algorithm associated with the at least one evaluation service to generate the at least one synthetic market value. One or more evaluation metrics for the at least one item identified in the price data set are generated based at least in part on the at least one synthetic market value, and further, generating at least one comparative metric for the at least one item wherein the comparative metric compares the price data for the at least one item in the price data set and/or the one or more evaluation metrics generated for the at least one item in the price data set with the one or more evaluation metrics generated for the respective item in the product specification data set.

The metric application is further programmed to manage at least one interface to communicate, via the network interface, at least a subset of the one or more received price data sets and the one or more evaluation metrics generated for the at least one item to at least the remotely located buyer-agent computing device from which the product specification data set was received.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 8A-8D are images of windows produced by a Web browser application installed on a client computer accessing a server illustrating one embodiment of the present disclosure.

DETAILED DESCRIPTION

Figure 1:
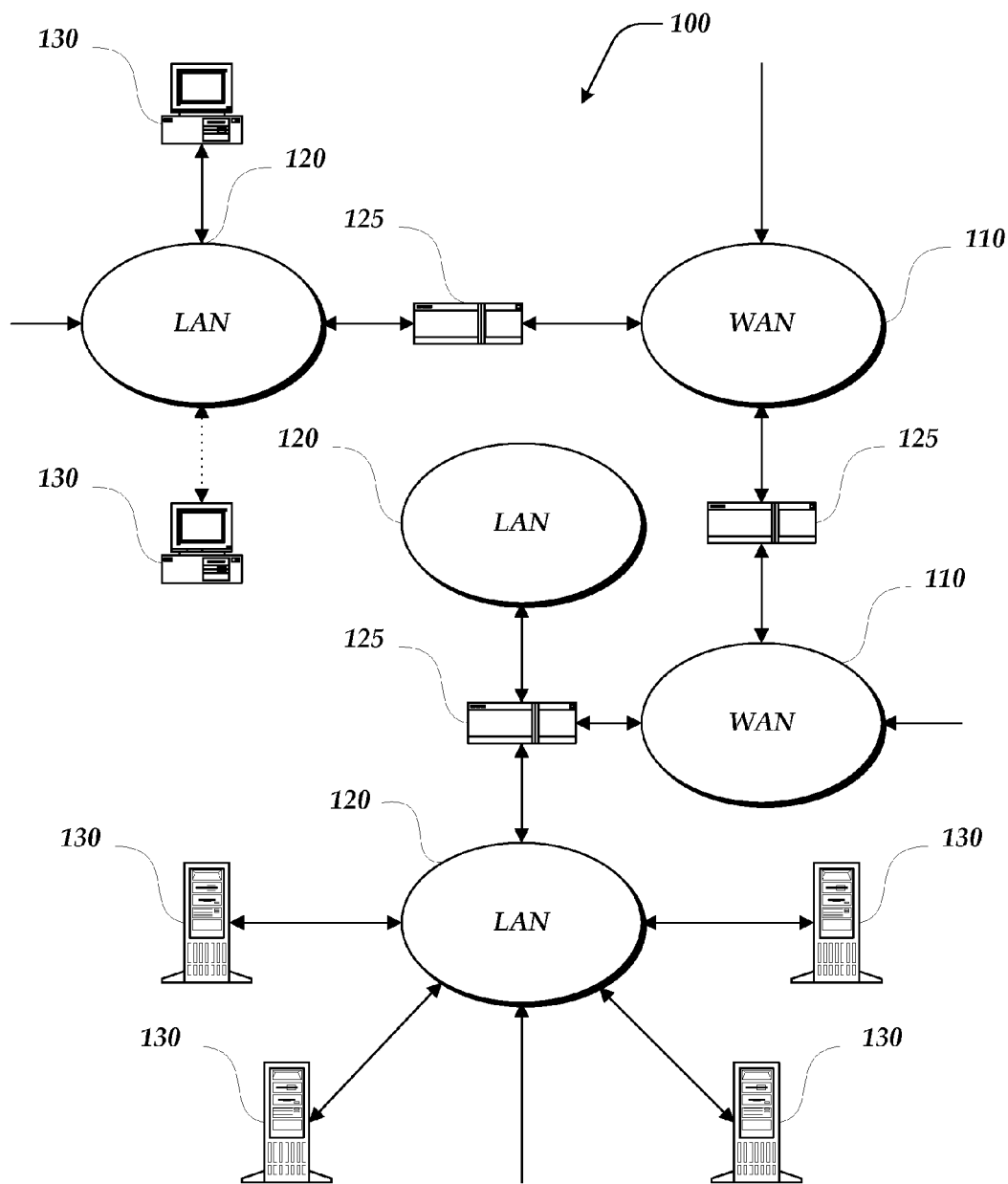
FIG. 1 is a block diagram of a prior art representative portion of the Internet.

The term "Internet" refers to the collection of networks and routers that use the Internet Protocol (IP) to communicate with one another. A representative section of the Internet 100 as known in the prior art is shown in FIG. 1 in which a plurality of local area networks (LANs) 120 and a wide area network (WAN) 110 are interconnected by routers 125. The routers 125 are generally special-purpose computers used to interface one LAN or WAN to another. Communication links within the LANs may be twisted wire pair, or coaxial cable, while communication links between networks may utilize 56 Kbps analog telephone lines, or 1 Mbps digital T-1 lines, and/or 45 Mbps T-3 lines. Further, computers and other related electronic devices can be remotely connected to either the LANs 120 or the WAN 110 via a modem and temporary telephone link. Such computers and electronic devices 130 are shown in FIG. 1 as connected to one of the LANs 120 via dotted lines. It will be appreciated that the Internet comprises a vast number of such interconnected networks, computers, and routers and that only a small representative section of the Internet 100 is shown in FIG. 1.

Figure 2:
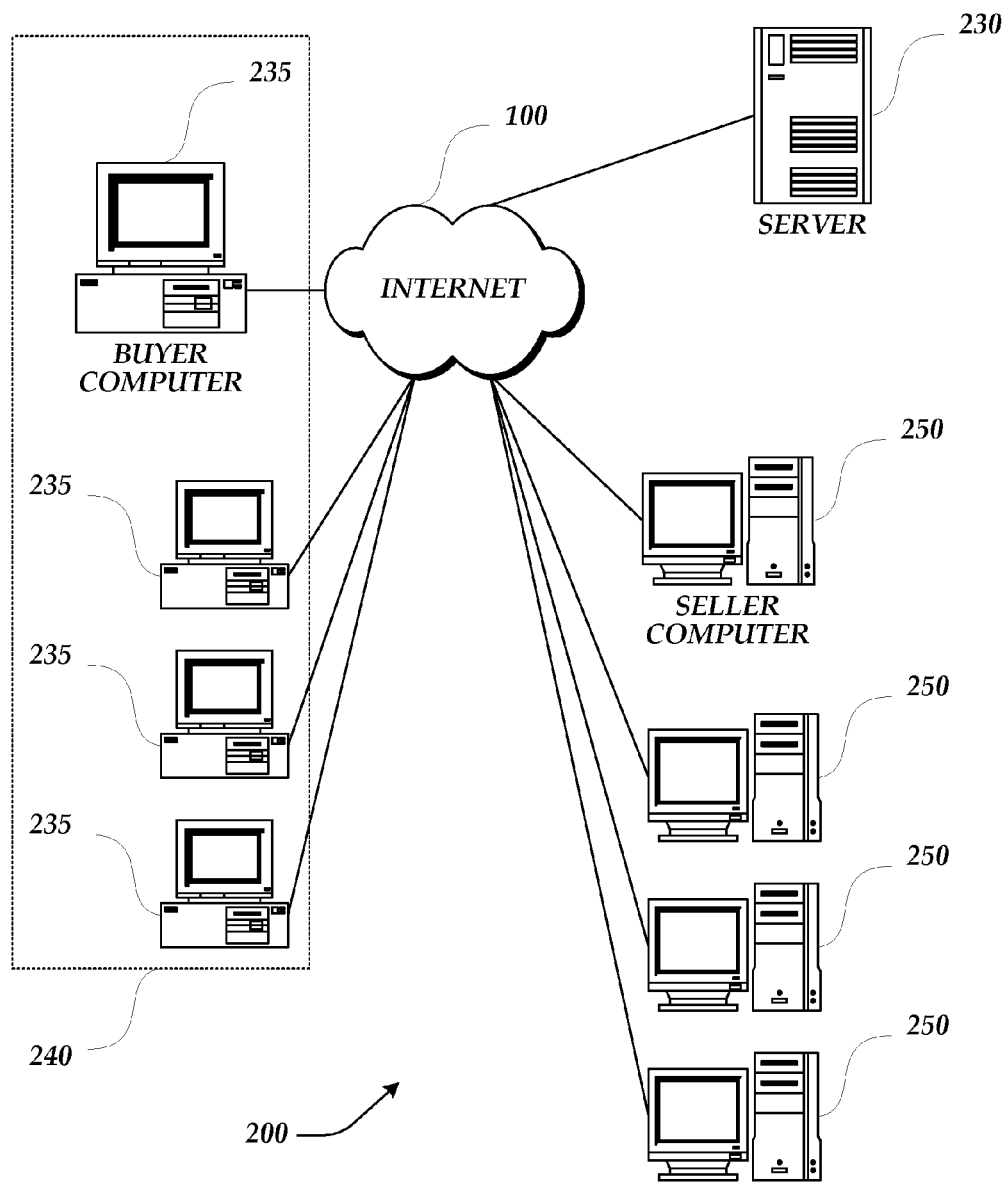
FIG. 2 is a pictorial diagram of a system of devices connected to the Internet, which depict the travel route of data.

The World Wide Web (WWW), on the other hand, is a vast collection of interconnected, electronically stored information located on servers connected throughout the Internet 100. Many companies are now providing services and access to their content over the Internet 100 using the WWW. In accordance with the present disclosure, and as shown in FIG. 2, there may be a plurality of buyers operating a plurality of client computing devices 235. FIG. 2 generally shows a system 200 of computers and devices to which an information server 230 is connected and to which the buyers' computers 235 are also connected. Also connected to the Internet 100 is a plurality of computing devices 250 associated with a plurality of sellers. The system 200 also includes a communications program, referred to as CEA, which is used on the sellers' computing devices 250 to create a communication means between the sellers' backend office software and the server applications.

The buyers of a market commodity may, through their computers 235, request information about a plurality of items or order over the Internet 100 via a Web browser installed on the buyers' computers. Responsive to such requests, the information server 230, also referred to as a server 230, may combine the first buyer's information with information from other buyers on other computing devices 235. The server 230 then transmits the combined buyer data to the respective computing devices 250 associated with the plurality of buyers. Details of this process are described in more detail below in association with FIGS. 5-7.

Those of ordinary skill in the art will appreciate that in other embodiments of the present disclosure, the capabilities of the server 230 and/or the client computing devices 235 and 250 may all be embodied in the other configurations. Consequently, it would be appreciated that in these embodiments, the server 230 could be located on any computing device associated with the buyers' or sellers' computing devices. Additionally, those of ordinary skill in the art will recognize that while only four buyer computing devices 235, four seller computing devices 250, and one server 230 are depicted in FIG. 2, numerous configurations involving a vast number of buyer and seller computing devices and a plurality of servers 230, equipped with the hardware and software components described below, may be connected to the Internet 100.

Figure 3:
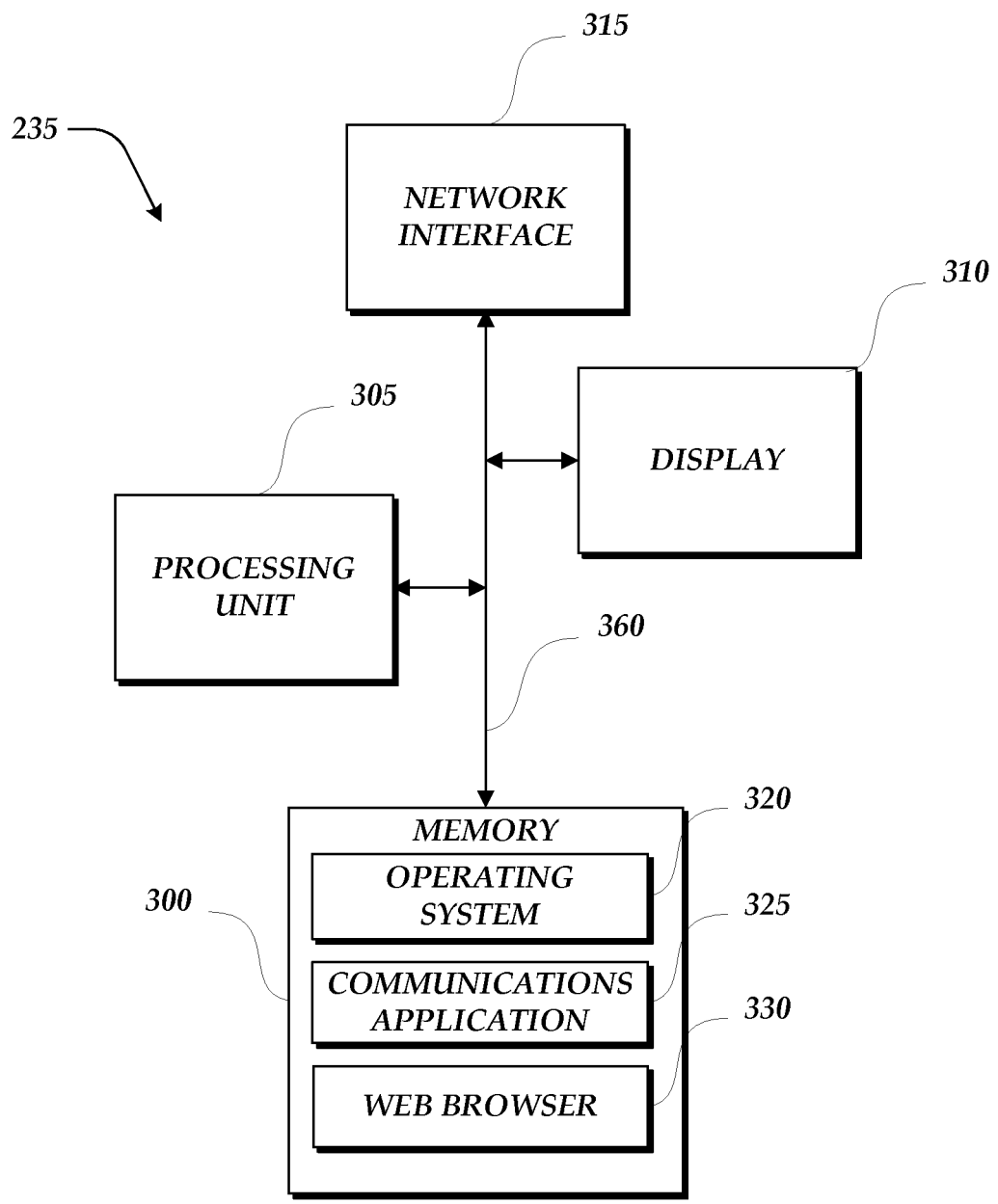
FIG. 3 is a block diagram of the several components of the buyer's computer shown in FIG. 2 that is used to request information on a particular route.

FIG. 3 depicts several of the key components of the buyer's client computing device 235. As known in the art, client computing devices 235 are also referred to as "clients" or "devices," and client computing devices 235 also include other devices such as palm computing devices, cellular telephones, or other like forms of electronics. A client computing device can also be the same computing device as the server 230. An "agent" can be a person, server, or a client computing device 235 having software configured to assist the buyer in making purchasing decisions based on one or more buyer-determined parameters. Those of ordinary skill in the art will appreciate that the buyer's computer 235 in actual practice will include many more components than those shown in FIG.

3. However, it is not necessary that all of these generally conventional components be shown in order to disclose an illustrative embodiment for practicing the present invention. As shown in FIG. 3, the buyer's computer includes a network interface 315 for connecting to the Internet 100. Those of ordinary skill in the art will appreciate that the network interface 315 includes the necessary circuitry for such a connection and is also constructed for use with TCP/IP protocol.

The buyer's computer 235 also includes a processing unit 305, a display 310, and a memory 300, all interconnected along with the network interface 315 via a bus 360. The memory 300 generally comprises a random access memory (RAM), a read-only memory (ROM), and a permanent mass storage device, such as a disk drive. The memory 300 stores the program code necessary for requesting and/or depicting a desired route over the Internet 100 in accordance with the present disclosure. More specifically, the memory 300 stores a Web browser 330, such as Netscape's NAVIGATOR® or Microsoft's INTERNET EXPLORER® browsers, used in accordance with the present disclosure for depicting a desired route over the Internet 100. In addition, memory 300 also stores an operating system 320 and a communications application 325. It will be appreciated that these software components may be stored on a computer-readable medium and loaded into memory 300 of the buyers' computer 235 using a drive mechanism associated with the computer-readable medium, such as a floppy, tape, or CD-ROM drive.

Figure 4:
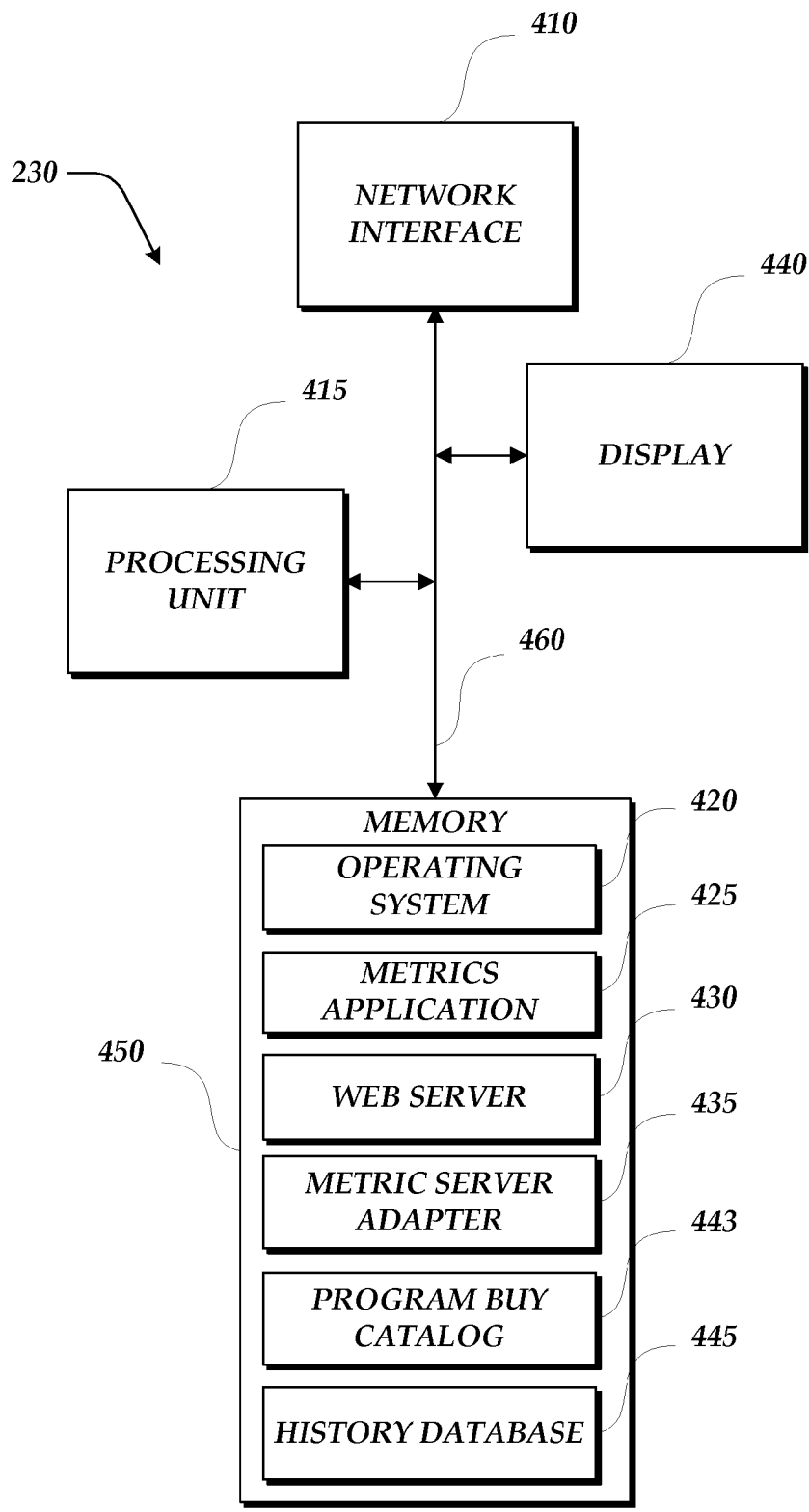
FIG. 4 is a block diagram of the several components of an information server shown in FIG. 2 that is used to supply information on a particular route.

As will be described in more detail below, the user interface which allows products to be ordered by the buyers are supplied by a remote server, i.e., the information server 230 located elsewhere on the Internet, as illustrated in FIG. 2. FIG. 4 depicts several of the key components of the information server 230. Those of ordinary skill in the art will appreciate that the information server 230 includes many more components than shown in FIG. 4. However, it is not necessary that all of these generally conventional components be shown in order to disclose an illustrative embodiment for practicing the present invention. As shown in FIG. 4, the information server 230 is connected to the Internet 100 via a network interface 410. Those of ordinary skill in the art will appreciate that the network interface 410 includes the necessary circuitry for connecting the information server 230 to the Internet 100, and is constructed for use with TCP/IP protocol.

The information server 230 also includes a processing unit 415, a display 440, and a mass memory 450, all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present disclosure. More specifically, the mass memory 450 stores a metrics application 425 formed in accordance with the present disclosure for managing the purchase forums of commodities products, and a metric server adapter 435 for managing metric data. In addition, mass memory 450 stores a database 445 of buyer information continuously logged by the information server 230 for statistical market analysis. It will be appreciated by those of ordinary skill in the art that the database 445 of product and buyer information may also be stored on other servers or storage devices connected to either the information server 230 or the Internet 100. Finally, mass memory 450 stores Web server software 430 for handling requests for stored information received via the Internet 100 and the WWW, and an operating system 420. It will be appreciated that the aforementioned software components may be stored on a computer-readable medium and loaded into mass memory 450 of the information server 230 using a drive mechanism associated with the computer-readable medium, such as floppy, tape, or CD-ROM drive. In addition, the data stored in the mass memory 450 and other memory can be "exposed" to other computers or persons for purposes of communicating data. Thus, "exposing" data from a computing device could mean transmitting data to another device or person, transferring XML data packets, transferring data within the same computer, or other like forms of data communications.

Figure 5:
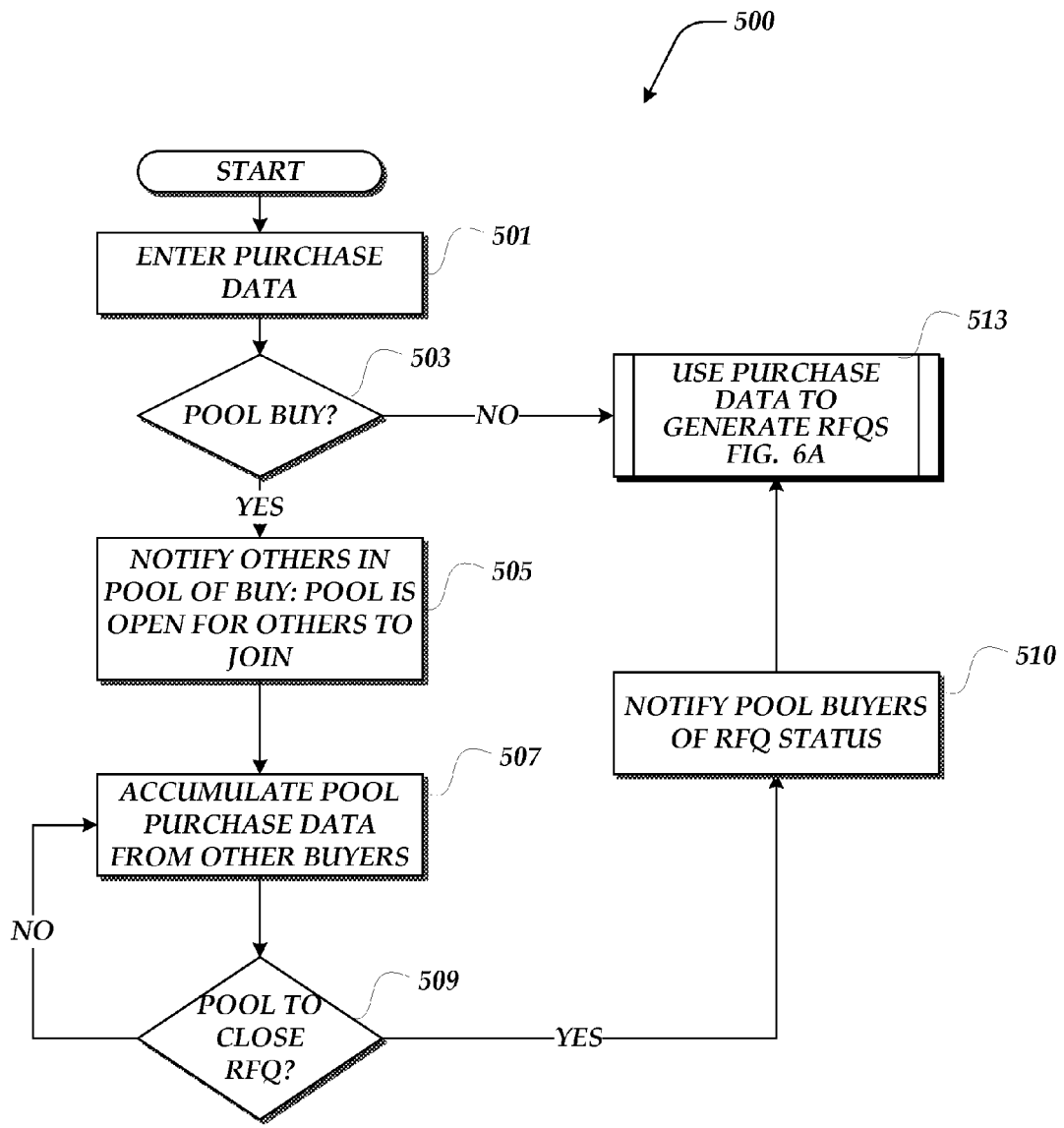
FIG. 5 is a flow diagram illustrating the logic of a routine used by the information server to receive and process the buyer's actions.

In accordance with one embodiment of the present disclosure, FIG. 5 is a flow chart illustrating the logic implemented for the creation of a Request for Quote (RFQ) by a singular buyer or a pool of buyers. In process of FIG. 5, also referred to as the pooling process 500, a buyer or a pool of buyers generate an RFQ which is displayed or transmitted to a plurality of sellers. Responsive to receiving the RFQ, the sellers then send quotes to the buyers.

In summary, the creation of the RFQ consists of at least one buyer initially entering general user identification information to initiate the process. The buyer would then define a Line Item on a Web page displaying an RFQ form. The Line Item is defined per industry specification and units of product are grouped as a "tally" per industry practice. The pooling process 500 allows buyers to combine RFQ Line Items with other buyers with like needs. In one embodiment, the pool buy feature is created by a graphical user interface where the RFQ Line Items from a plurality of buyers are displayed on a Web page to one of the pool buyers, referred to as the pool administrator. The server 230 also provides a Web-based feature allowing the pool administrator to selectively add each RFQ Line Item to one combined RFQ. The combined RFQ is then sent to at least one vendor or seller. This feature provides a forum for pooling the orders of many buyers, which allows individual entities or divisions of larger companies to advantageously bid for larger orders, thus providing them with more bidding power and the possibility of gaining a lower price.

Figure 8A:
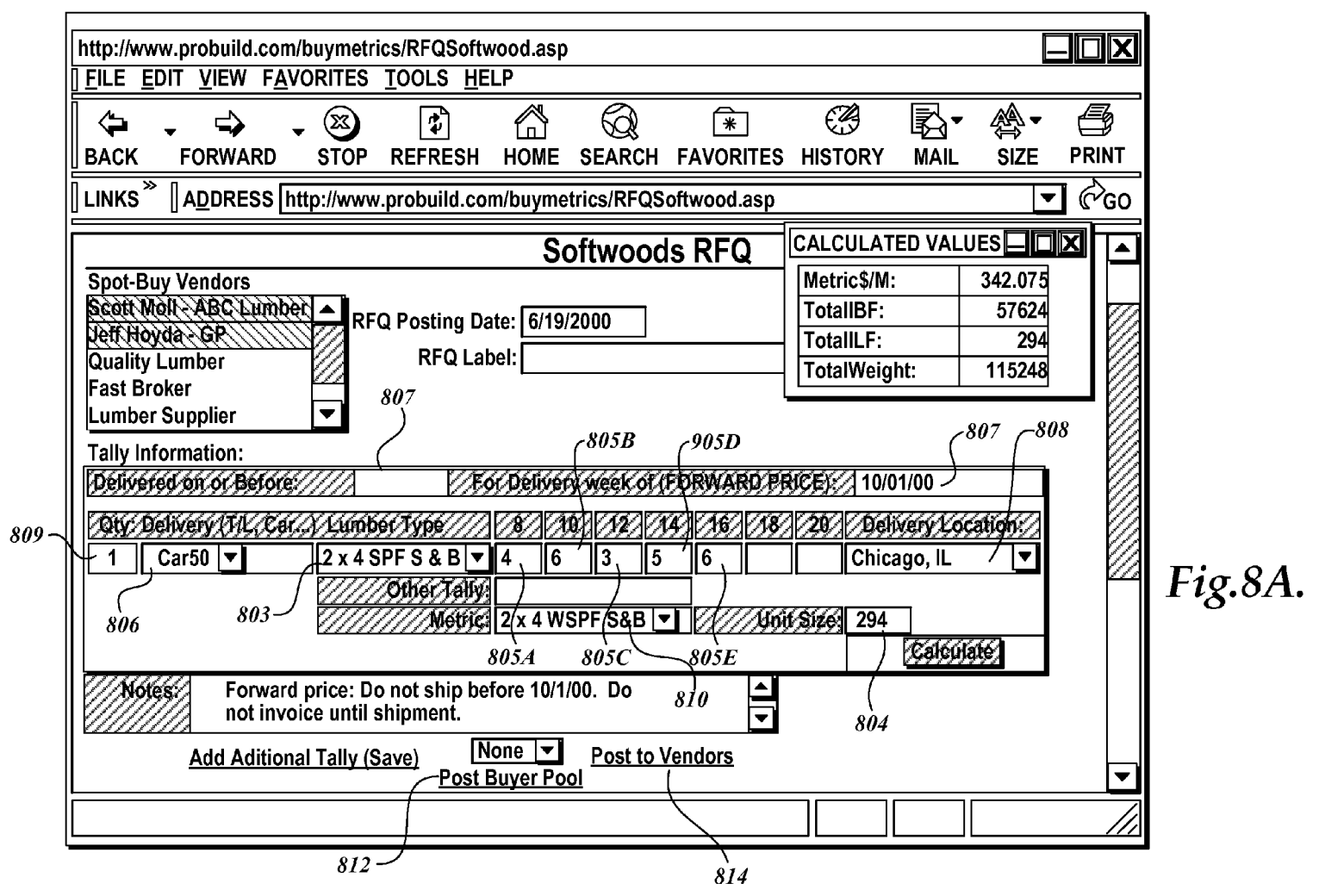

The pooling process 500 begins in step 501 where a buyer initiates the process by providing buyer purchase data. In step 501, the buyer accesses a Web page transmitted from the server 230 configured to receive the buyer purchase data, also referred to as the product specification data set or the Line Item data. One exemplary Web page for the logic of step 501 is depicted in FIG. 8A. As shown in FIG. 8A, the buyer enters the Line Item data specifications in the fields of the Web page. The Line Item data consists of lumber species and grade 803, number of pieces per unit 804, quantities of the various units comprising the preferred assortment in the tally 805A-E, delivery method 806, delivery date 807, delivery location 808, and the overall quantity 809. In one embodiment, the buyer must define the delivery date as either contemporaneous "on-or-before" delivery date or specify a delivery date in the future for a "Forward Price" RFQ. In addition, the buyer selects a metric or multiple metrics in a field 810 per RFQ Line Item (tally). As described in more detail below, the metric provides pricing data that is used as a reference point for the buyer to compare the various quotes returned from the sellers. The buyer RFQ Line Item data is then stored in the memory of the server 230.

Returning to FIG. 5, at a next step 503, the server 230 determines if the buyer is going to participate in a pool buy. In the process of decision block 503, the server 230 provides an option in a Web page that allows the buyer to post their Line Item data to a vendor or post their Line Item data to a buyer pool. The window illustrated in FIG. 8A is one exemplary Web page illustrating these options for a buyer. As shown in FIG. 8A, the links "Post Buyer Pool" 812 and "Post to Vendors" 814 are provided on the RFQ Web page.

At step 503, if the buyer does not elect to participate in a pool buy, the process continues to step 513 where the server 230 generates a request for a quote (RFQ) from the buyer's Line Item data. A detailed description of how the server 230 generates a request for a quote (RFQ) is summarized below and referred to as the purchase order process 600A depicted in FIG. 6A.

Alternatively, at decision block 503, if the buyer elects to participate in a pool buy, the process continues to step 505 where the system notifies other buyers logged into the server 230 that an RFQ is available in a pool, allowing other buyers to add additional Line Items (tallies) to the RFQ. In this part of the process, the Line Items from each buyer are received by and stored in the server memory. The Line Items provided by each buyer in the pool are received by the server 230 using the same process as described above with reference to block 501 and the Web page of FIG. 8A. All of the Line Items stored on the server 230 are then displayed to a pool administrator via a Web page or an e-mail message. In one embodiment, the pool administrator is one of the buyers in a pool where the pool administrator has the capability to select all of the Line Item data to generate a combined RFQ. The server 230 provides the pool administrator with this capability by the use of any Web-based communicative device, such as e-mail or HTML forms. As part of the process, as shown in steps 507 and 509, the pool may be left open for a predetermined period of time to allow additional buyers to add purchase data to the current RFQ.

At decision block 509, the server 230 determines if the pool administrator has closed the pool. The logic of this step 509 is executed when the server 230 receives the combined RFQ data from the pool administrator. The pool administrator can send the combined RFQ data to the server 230 via an HTML form or by other electronic messaging means such as e-mail or URL strings. Once the server 230 has determined that the pool is closed, the process continues to block 510 where the Line Items from each buyer (the combined RFQ) are sent to all of the buyers in the pool. The process then continues to step 513 where the server 230 sends the combined RFQ to the vendors or sellers.

Figure 6A:
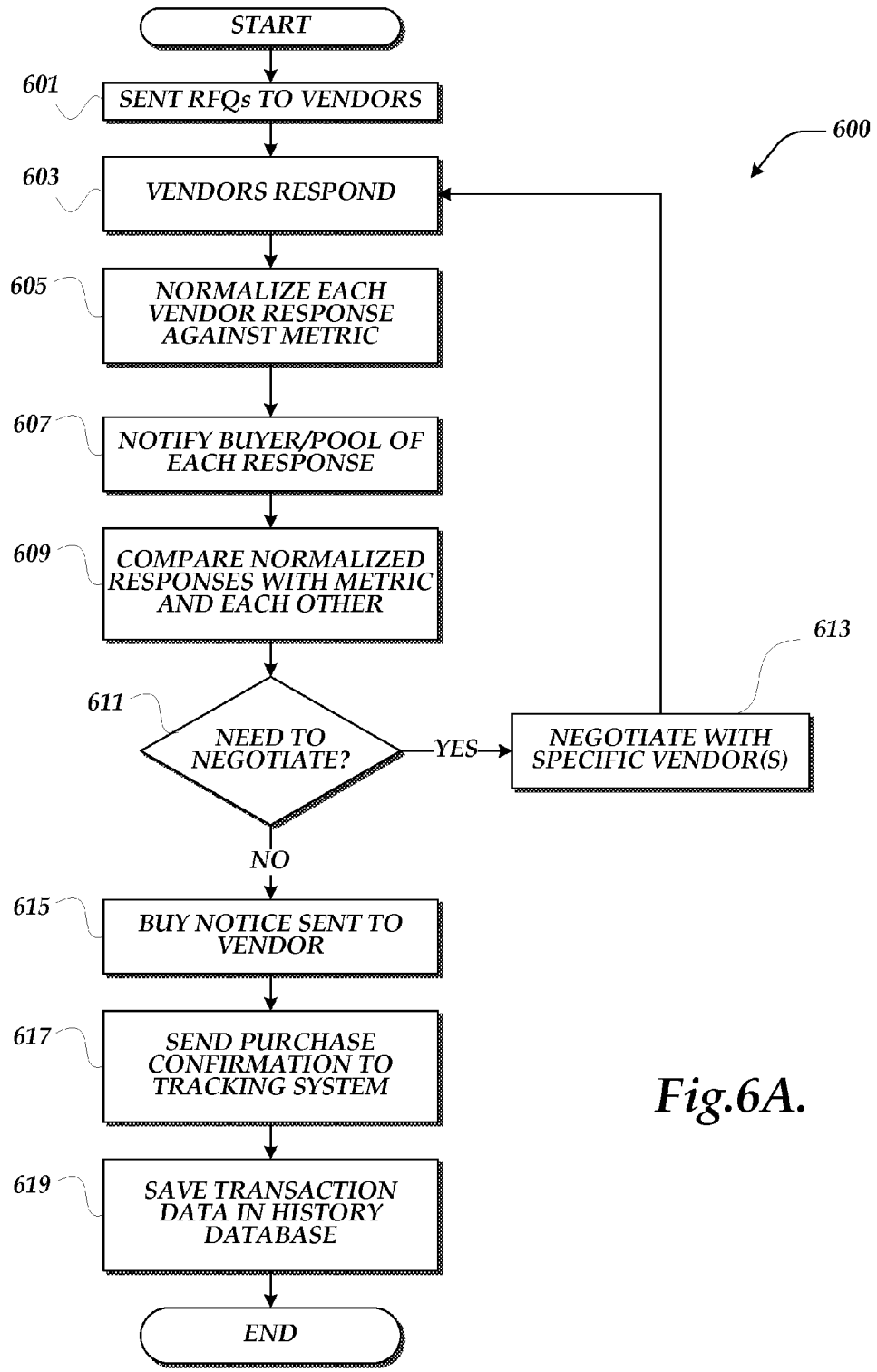
FIGS. 6A-6B are flow diagrams illustrating another embodiment of the logic used by the information server to receive and process the quotes and quote requests of both buyers and vendors.

Referring now to FIG. 6A, one embodiment of the purchase-negotiation process 600 is disclosed. The purchase-negotiation process 600 is also referred to as a solicited offer process or the market purchase process. In summary, the purchase-negotiation process 600 allows at least one buyer to submit an RFQ and then view quotes from a plurality of vendors and purchase items from selected vendor(s). The logic of FIG. 6A provides buyers with a forum that automatically manages, collects, and normalizes the price of desired commodity items. The purchase-negotiation process 600 calculates a normalized price data set that is based on a predefined metric(s). The calculation of the normalized price data set in combination with the format of the Web pages described herein create an integrated forum where quotes for a plurality of inherently dissimilar products can be easily obtained and compared.

The purchase-negotiation process 600 begins at step 601 where the RFQ, as generated by one buyer or a pool of buyers in the process depicted in FIG. 5, is sent to a plurality of computing devices 250 associated with a plurality of sellers or vendors. The vendors receive the RFQ via a Web page transmitted by the server 230. In one embodiment, the vendors receive an e-mail message having a hypertext link to the RFQ Web page to provide notice to the vendor. Responsive to the information in the buyers' RFQ, the process then continues to step 603 where at least one vendor sends their quote information to the server 230.

In the process of step 603, the vendors respond to the RFQ by sending their price quote to the server 230 for display via a Web page to the buyer or buyer pool. Generally described, the vendors send an HTML form or an e-mail message with a price and description of the order. The description of the order in the quote message contains the same order information as the RFQ.

Figure 8B:
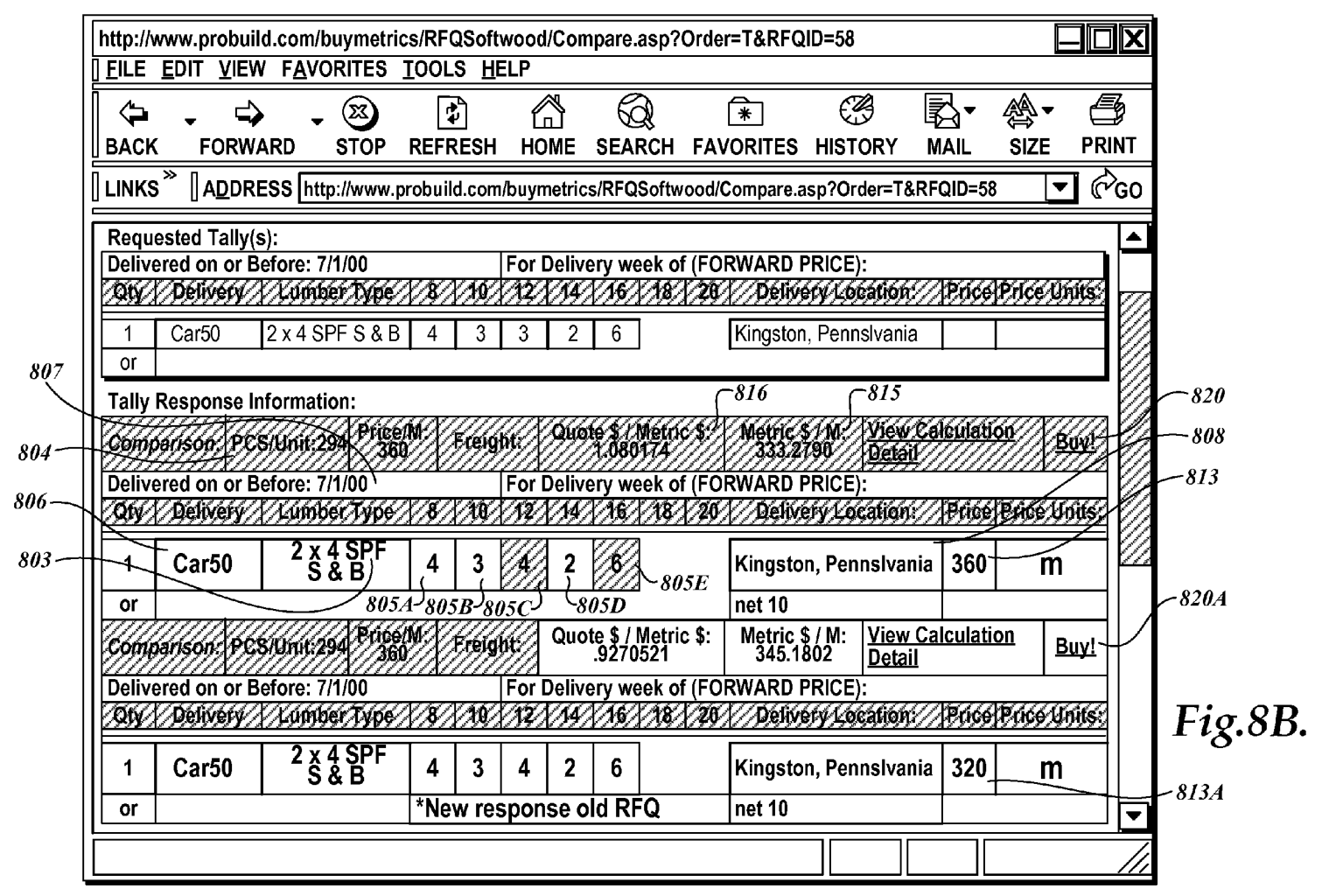

FIG. 8B illustrates one exemplary Web page of a vendor quote that is displayed to the buyer. As shown in FIG. 8B, the vendor quote includes the vendor's price 813, the lumber species and grade 803, number of pieces per unit 804, quantities of the various units comprising the preferred assortment in the tally 805A-E, delivery method 806, delivery date 807, and delivery location 808. In the quote response message, the vendor has the capability to modify any of the information that was submitted in the RFQ. For example, the vendor may edit the quantity values for the various units comprising the preferred assortment in the tally 805A-E. This allows the vendor to adjust the buyer's request according to the vendor's inventory, best means of transportation, etc. All of the vendor's quote information is referred to as price data set or the RFQ Line Item (tally) quote.

Returning to FIG. 6A, the process continues to step 605, where the server 230 normalizes the price of each RFQ Line Item (tally) quote from each vendor. The normalization of the vendor's price is a computation that evaluates the vendor's price utilizing data from a metric. The normalization process is carried out because each vendor may respond to the Line Items of an RFQ by quoting products that are different from a buyer's RFQ and/or have a different tally configuration. The normalization of the pricing allows the buyers to objectively compare the relative value of the different products offered by the plurality of vendors. For example, one vendor may produce a quote for an RFQ of: one unit of 2×4×12, two units of 2×4×12, and three units of 2×4×16. At the same time, another vendor may submit a quote for three units of 2×4×12, one unit of 2×4×12, and two units of 2×4×16. Even though there is some difference between these two offerings, the price normalization process provides a means for the buyer to effectively compare and evaluate the different quotes even though there are variations in the products. The price normalization process 900 is described in more detail below in conjunction with the flow diagram of FIG. 9.

Returning again to FIG. 6A, at step 607 the vendor's quote information is communicated to the buyer's computer for display. As shown in FIG. 8B and described in detail above, the vendor's quote is displayed via a Web page that communicates the vendor's quote price 813 and other purchase information. In addition, the vendor's quote page contains a metric price 815 and a quote price versus metric price ratio 816. The metric price 815 and the quote price versus metric price ratio 816 are also referred to as a normalized price data value. A ratio higher than one (1) indicates a quote price that is above the metric price, and a lower ratio indicates a quote price that is below the metric price.

Next, at step 609, the buyer or the administrator of the buyer pool compares the various products and prices quoted by the vendors along with the normalized price for each Line Item on the RFQ. In this part of the process, the buyer may decide to purchase one of the products from a particular vendor and sends a notification to the selected vendor indicating the same. The buyer notifies the selected vendor by the use of an electronic means via the server 230, such as an HTML form, a chat window, e-mail, etc. For example, the quote Web page depicted in FIG. 8B shows two different quotes with two different tallies, the first quote price 813 of $360, and the second quote price 813A of $320. If the buyer determines that they prefer to purchase the materials listed in the first quote, the buyer selects the "Buy!" hyperlink 820 or 820A associated with the desired tally.

If the buyer is not satisfied with any of the listed vendor quotes, the server 230 allows the buyer to further negotiate with one or more of the vendors to obtain a new quote. This step is shown in decision block 611, where the buyer makes the determination to either accept a quoted price or proceed to step 613 where they negotiate with the vendor to obtain another quote or present a counter-offer. Here, the server 230 provides a graphical user interface configured to allow the buyer and one vendor to electronically communicate, using, e.g., a chat window, streaming voice communications, or other standard methods of communication. There are many forms of electronic communications known in the art that can be used to allow the buyer and vendors to communicate.

The buyer and seller negotiate various quotes and iterate through several steps 603-613 directed by the server 230, where each quote is normalized, compared, and further negotiated until a quote is accepted by the buyer or negotiations cease. While the buyer and seller negotiate the various quotes, the server 230 stores each quote until the two parties agree on a price. At any step during the negotiation process, the system always presents the buyer with an option to terminate the negotiation if dissatisfied with the quote(s).

At decision block 611, when a buyer agrees on a quoted price, the process then continues to step 615 where the buyer sends a notification message to the vendor indicating they have accepted a quote. As described above with reference to steps 603-613, the buyer notification message of step 615 may be in the form of a message on a chat window, e-mail, by an HTML form, or the like. However, the buyer notification must be transmitted in a format that allows the system to record the transaction. The buyer notification may include all of the information regarding the specifications by RFQ Line Item, such as, but not limited to, the buy price, date, and method of shipment, and payment terms.

The purchase-negotiation process 600 is then finalized when the system, as shown in step 617, sends a confirmation message to a tracking system. The confirmation message includes all of the information related to the agreed sales transaction.

Optionally, the process includes step 619, where the server 230 stores all of the information related to RFQ, offers, and the final sales transaction in a historical database. This would allow the server 230 to use all of the transaction information in an analysis process for providing an improved method of obtaining a lower market price in future transactions and in identifying optimum purchasing strategy. The analysis process is described in further detail below. Although the illustrated embodiment is configured to store the data related to the sales transactions, the system can also be configured to store all of the iterative quote information exchanged between the buyer and vendor.

Figure 6B:
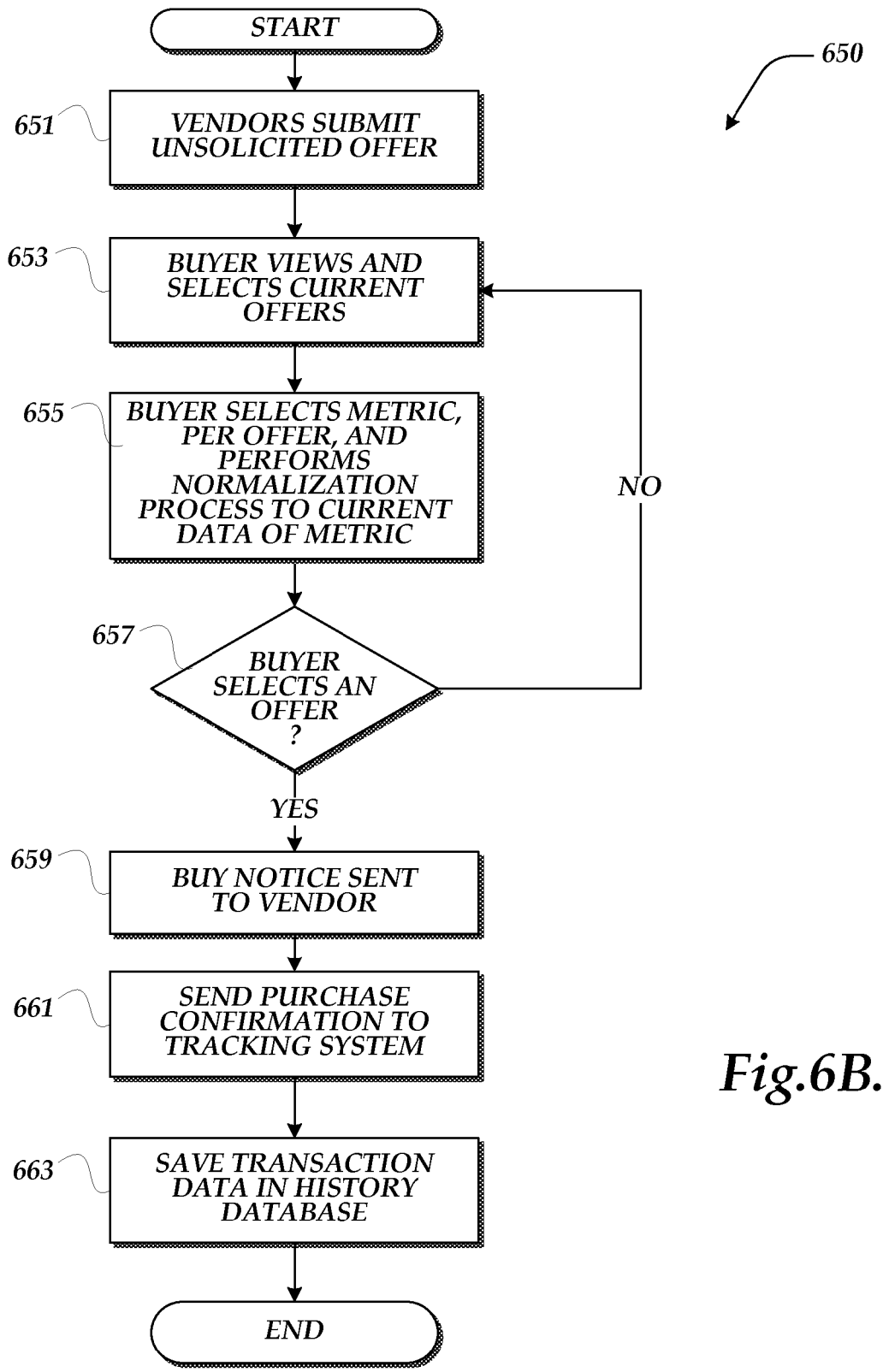

Referring now to FIG. 6B, an embodiment of the unsolicited offer process 650 is disclosed. In summary, the unsolicited offer process 650, also referred to as the unsolicited market purchase process, allows at least one buyer to view unsolicited offers from a plurality of vendors and purchase items from a plurality of vendors from the offers. The logic of FIG. 6B provides buyers with a forum that automatically manages, collects, and normalizes price quotes based on metric data. By the price normalization method of FIG. 6B, the server 230 creates an integrated forum where offers from a plurality of inherently dissimilar products can be obtained and normalized for determination of purchase.

The unsolicited offer process 650 begins at step 651 where the plurality of vendors is able to submit offers to the server 230. This part of the process is executed in a manner similar to step 603 of FIG. 6A, where the vendor submits a quote to the server 230. However, in the Web page of step 651, the server 230 generates a Web page containing several tallies from many different vendors. In addition, at step 651, the server 230 stores all of the unsolicited offer data provided by the vendors.

Next, at step 653, a buyer views the offers stored on the server 230. This part of the process is carried out in a manner similar to the process of step 603 or 607 where the server 230 displays a plurality of offers similar to the tallies depicted in FIG. 8A.

Next, at step 655, the buyer selects a metric for the calculation of the normalized price associated with the selected offer. As described in more detail below, metrics may come from publicly available information, i.e., price of futures contracts traded on the Chicago Mercantile Exchange, subscription services such as Crowes™ or Random Lengths™ accessed via the metric server adapter 435 (shown in FIG. 4), or internally generated metrics derived from the data stored in the server 230. The normalization calculation, otherwise referred to as the normalization process, occurs each time the buyer views a different offer, and the normalization calculation uses the most current metric data for each calculation. The normalization process is carried out because each vendor will most likely offer products that may vary from products of other vendors and have a different tally configuration from those supplied by other vendors. The normalization of the pricing allows the buyers to compare the relative value of the different products offered by the number of vendors. The metric price for each selected offer is displayed in a similar manner as the metric price 815 and 816 shown in the Web page of FIG. 8B.

Next, at decision block 657, the buyer selects at least one offer for purchase. This is similar to the process of FIG. 6A in that the buyer selects the "Buy!" hyperlink 820 associated with the desired tally to purchase an order. The process then continues to steps 659-663, where, at step 659, the process transmits a buy notice to the vendor, then, at step 661, sends a purchase confirmation to the tracking system, and then, at step 663, saves the transaction data in the server database. The steps 659-663 are carried out in the same manner as the steps 615-619 of FIG. 6A. In the above-described process, the buyer notification may include all of the information regarding the specifications by RFQ Line Item, and data such as, but not limited to, the buy price, date, and method of shipment, and the payment terms.

Figure 7:
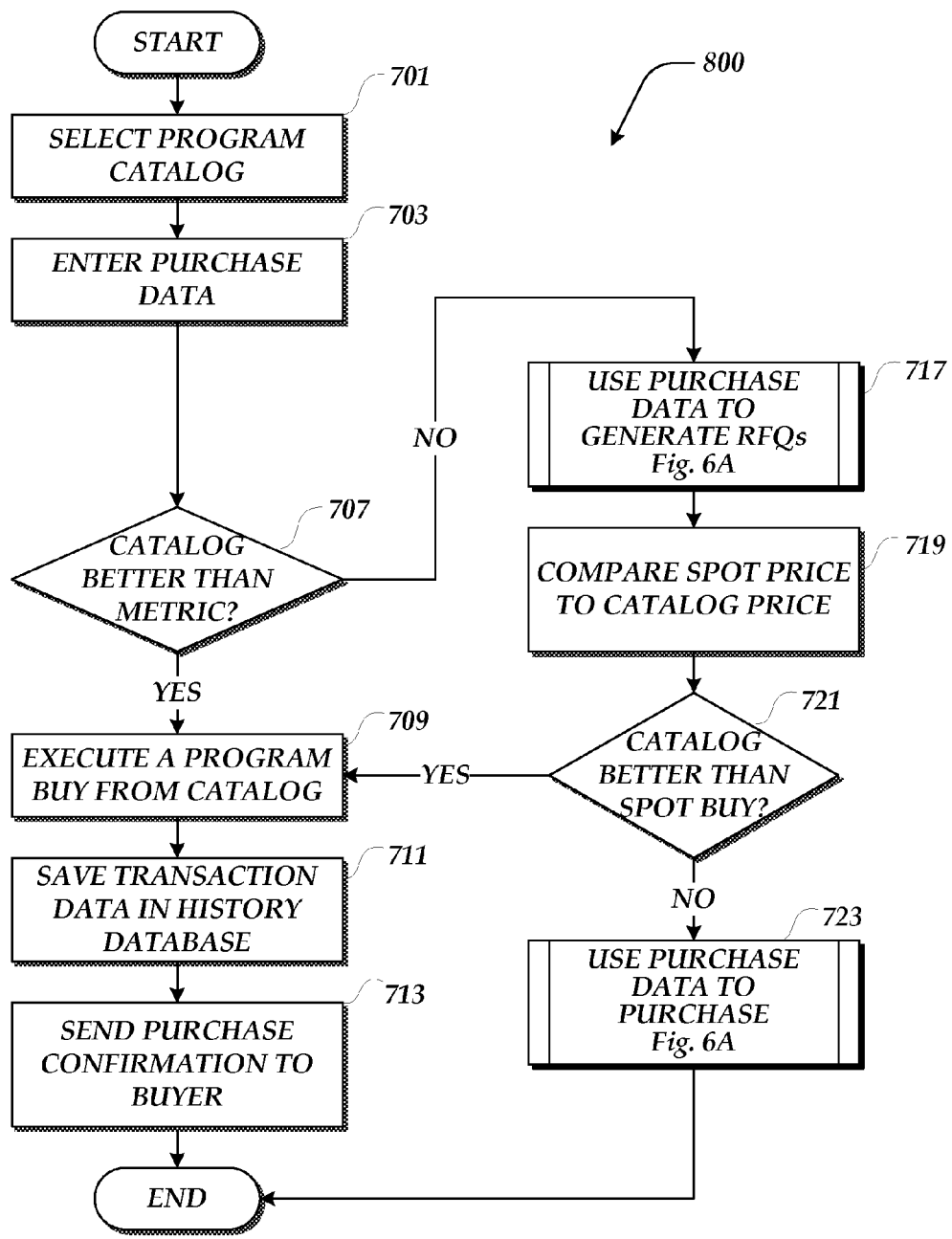
FIG. 7 is a flow diagram illustrating another embodiment of the logic used by the information server to execute the process of a catalog purchase.

Referring now to FIG. 7, a flow diagram illustrating yet another embodiment of the present disclosure is shown. FIG. 7 illustrates the catalog purchase process 700. This embodiment allows buyers to search for a catalog price of desired commerce items, enter their purchase data based on the pre-negotiated catalog prices, and to compare those catalog prices with a selected metric price and the current market price, wherein the current market price is determined by the purchase-negotiation process 600.

The process starts at step 701 where the buyer selects a program buy catalog 443. The program buy catalog 443 provides buyers with the published or pre-negotiated price of the desired products. Next, at step 703, based on the catalog information, the buyer then enters their purchase data. Similar to step 501 of FIG. 5 and the tally shown in FIG. 8A, the buyer sends purchase data to the server 230, such as the desired quantity of each item and the lumber species, grade, etc.

The process then proceeds to decision block 707 where the buyer makes a determination of whether to purchase the items using the catalog price or purchase the desired product in the open market. Here, the server 230 allows the user to make this determination by displaying the metric price of each catalog price. This format is similar to the metric price 815 and 816 displayed in FIG. 8B.

At decision block 707, if the buyer determines that the catalog price is better than a selected metric price, the process then proceeds to steps 709, 711, and 713, where a program buy from the catalog is executed, and the buyer's purchase information is stored on the server 230 and sent to the vendor's system to confirm the sale. These steps 711-713 are carried out in the same manner as the confirmation and save steps 617 and 619 as shown in FIG. 6A.

At decision block 707, if the buyer determines that the metric price is better than the catalog price, the process continues to step 717 where the buyer's purchase data is entered into an RFQ. At this step, the process carries out the first five steps 601-609 of the method of FIG. 6A to provide buyers with the price data from the open market, as well as provide the normalized prices for each open market quote. At step 719, the server 230 then displays a Web page that allows the user to select from a purchase option of a catalog or spot (market) purchase. At decision block 721, based on the displayed information, the buyer will then have an opportunity to make a determination of whether they will proceed with a catalog purchase or an open market purchase.

At decision block 721, if the buyer proceeds with the catalog purchase, the process continues to step 709 where the catalog purchase is executed. Steps 709-713 used to carry out the catalog purchase are the same as if the buyer had selected the catalog purchase in step 707. However, if at decision block 721 the buyer selects the option to proceed with the market purchase, the process continues to step 723 where the RFQ generated in step 717 is sent to the vendor. Here, the process carries out the steps of FIG. 6 to complete the open market purchase. More specifically, the process continues to step 609 where the buyer compares the normalized prices from each vendor. Once a vendor is selected, the negotiation process of steps 603-613 is carried out until the buyer decides to execute the purchase. Next, the transaction steps 615-619 are carried out to confirm the purchase, notify the tracking system, and save the transactional data on the historical database.

Optionally, the process can include a step where the server 230 stores all of the information related to program buy and metric comparisons and the final sales transaction in a historical database. This would allow the server 230 to use all of the transaction information in an analysis process for providing an improved method of obtaining the value of the program. Although the illustrated embodiment is configured to store the data related to the sales transactions, the system can also be configured to store all of the iterative quote information exchanged between the buyer and vendor.

The analysis process allows the server 230 to utilize the sales history records stored in steps 619 and 711 to generate price reports for various third parties as well as provide a means of calculating current market prices for products sold in the above-described methods. The sales history records are also used as the source for a metric, such as those used in the process of FIGS. 6A, 6B, and 7. As shown in steps 619, 663, and 711, the server 230 continually updates the historical database for each sales transaction. The analysis reporting process allows a buyer or manager of buyers to conduct analysis on the historical information. This analysis would include multi-value cross compilation for purposes of determining purchasing strategies, buyer effectiveness, program performance, vendor performance, and measuring effectiveness of forward pricing as a risk management strategy.

Figure 9:
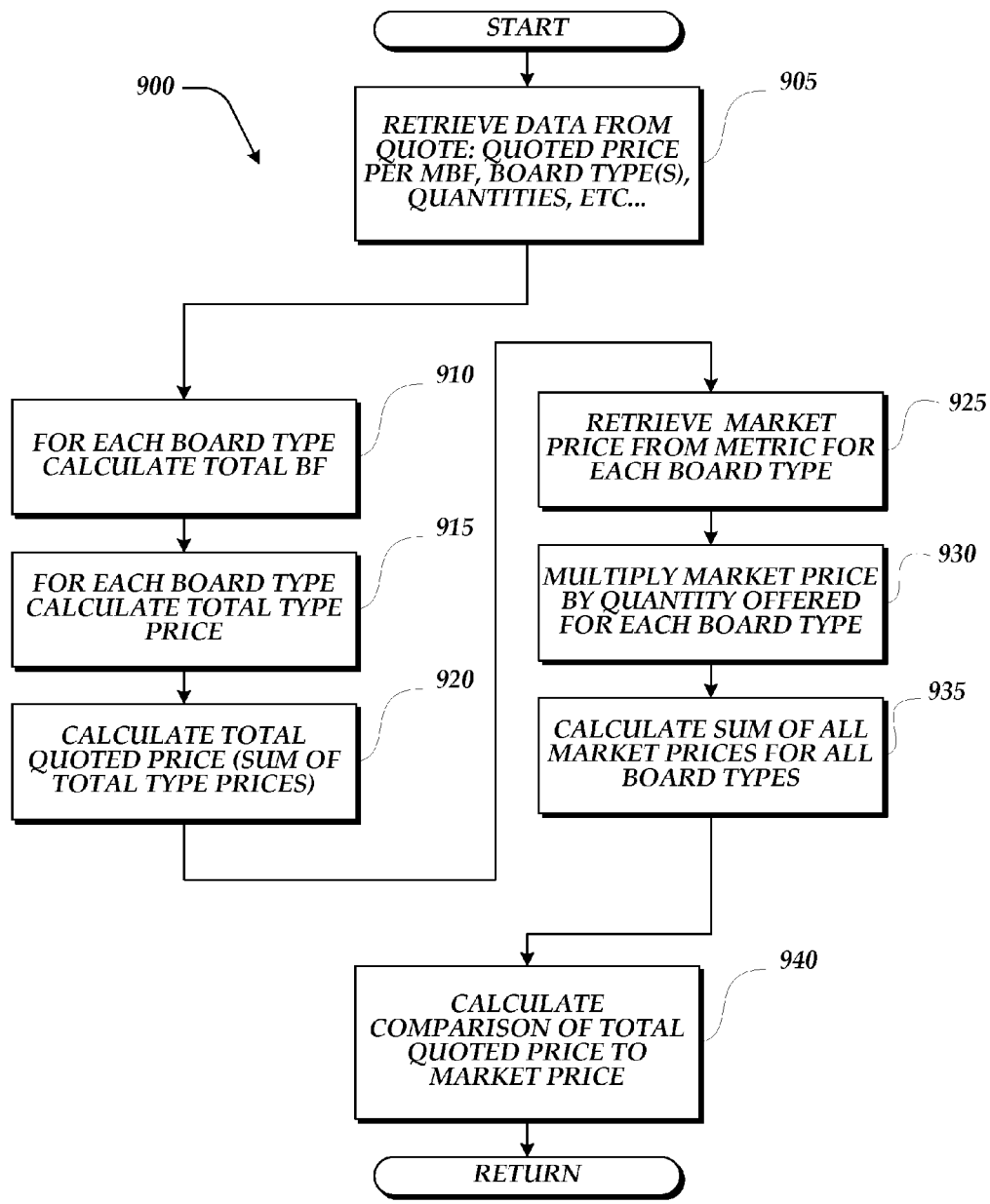
FIG. 9 is a flow diagram illustrating one embodiment of the normalization process described herein.

Referring now to FIG. 9, a flow diagram illustrating the logic of the normalization process 900 is shown. The logic of the normalization process 900 resides on the server 230 and processes the quotes received from commodity sellers. The logic begins at step 905 where quote data is obtained from the seller in response to the buyer's RFQ as described above.

Next, at step 910, routine 900 iteratively calculates the board footage (BF) of each type of lumber. Once all the totals are calculated for each type, routine 900 continues to step 915 where the server 230 calculates the total type price.

At step 915, routine 900 iteratively calculates the total type price for the amount of each type of lumber specified in the quote. This is accomplished by taking the total board footage (BF) calculated in block 910 and multiplying the total BF by the price per MBF specified in the quote. Once all the prices are calculated for each type, routine 900 continues to step 920 where the server 230 calculates the total quoted price. At step 920, the routine 900 calculates the total price for the quote by summing all of the total type prices calculated at step 915.

At step 925, routine 900 iteratively retrieves the most current price for each type of lumber specified in the quote from a predefined metric source(s). Metrics may come from publicly available information, i.e., price of futures contracts traded on the Chicago Mercantile Exchange, subscription service publications such as Crowes™ or Random Lengths™ accessed via the metric server adapter 435 (shown in FIG. 4), or internally generated metrics derived from the server database. Once all the prices are retrieved for each type, at step 930, the routine 900 then iteratively calculates the market price for the quantity of each type of lumber in the quote. Once the totals for all types are calculated, routine 900 continues to step 935 where the routine 900 calculates the total market price for the quote by summing all the most current prices calculated in step 930. Although this example illustrates that steps 910-920 are executed before steps 925-935, these two groups of steps can be executed in any order, or in parallel, so long as they are both executed before a comparison step 940.

At step 940, routine 900 compares the total quoted to the metric price to arrive at a comparative value. In one exemplary embodiment of the current invention, the comparative value is a "percent of metric" value. A value higher than one hundred (100) percent indicates a price that is above the metric rate, and a lower percent indicates a price that is below the metric rate.

The operation of routine 900 can be further illustrated through an example utilizing specific exemplary data. In the example, a buyer sends out a request for a quote (RFQ) requesting a lot of 2×4 S&B lumber consisting of five units of 2"×4"×8', two units of 2"×4"×14', and five units of 2"×4"×16'. The buyer then receives quotes from three sellers. Seller A responds with a tally of six units of 2"×4"×8', four units of 2"×4"×14', and three units of 2"×4"×16' for $287 per thousand board feet. Seller B responds with a lot of five units of 2"×4"×8', one unit of 2"×4"×14', and six units of 2"×4"×16' for $283 per thousand board feet. Seller C responds with a lot of one unit of 2"×4"×8', five units of 2"×4"×14', and five units of 2"×4"×16' for $282 per thousand board feet. Suppose also that the typical unit size is 294 pieces/unit, and the metric or reported market price for 2"×4"×8' s is $287.50, for 2"×4"×14' s is $278.50, and for 2"×4"×16' is $288.

Viewing the MBF prices for the respective quotes is not particularly informative, given that certain lengths of lumber are more desirable and priced accordingly in the marketplace. By processing the quote from Seller A using routine 900, we arrive at a total MBF of 29.792, giving a total quoted price of $8,550.30. The selected metric price for the same types and quantities of lumber would be $8,471.12; therefore, the quoted price would have a percent of market value of 100.93%. Processing the quote from Seller B using routine 900, we arrive at a total MBF of 29.400, giving a total quoted price of $8,320.20. The selected metric price for the same types and quantities of lumber, however, would be $8,437.21; therefore, the quoted price would have a percent of market value of 98.61%. Finally, processing the quote from Seller C using routine 900, we arrive at a total MBF of 30.968, giving a total quoted price of $8,732.98. The selected metric price for the same types and quantities of lumber, however, would be $8,767.66; therefore, the quoted price would have a percent of market value of 99.38%. By looking at the percent of selected metric value, it is apparent that the price from Seller B is a better value. As shown in the methods of FIGS. 5-7, this price normalization process allows users to compare inherently different offers having different quality and quantity values.

In yet another example of an application of the normalization process, additional exemplary data is used to demonstrate the analysis of a transaction having one RFQ from a buyer and two different quotes from a seller, normalized to comparable product of another species. In this example, the buyer produces an RFQ listing the following items: one carload of Eastern SPF (ESPF) lumber having four units of 2"×4"×8', four units of 2"×4"×10', six units of 2"×4"×12', two units of 2"×4"×14', and six units of 2"×4"×16'. The vendor then responds with two different quotes with two different unit tallies and two different prices. The first response lists a quote price of $320 per thousand board feet, and a slight modification of the tally provides four units of 2"×4"×8', four units of 2"×4"×10', six units of 2"×4"×12', three units of 2"×4"×14', and five units of 2"×4"×16'. The second response quotes per the requested tally at a price of $322 per thousand board feet. Both quotes list the delivery location as "Chicago."

Figure 8C:
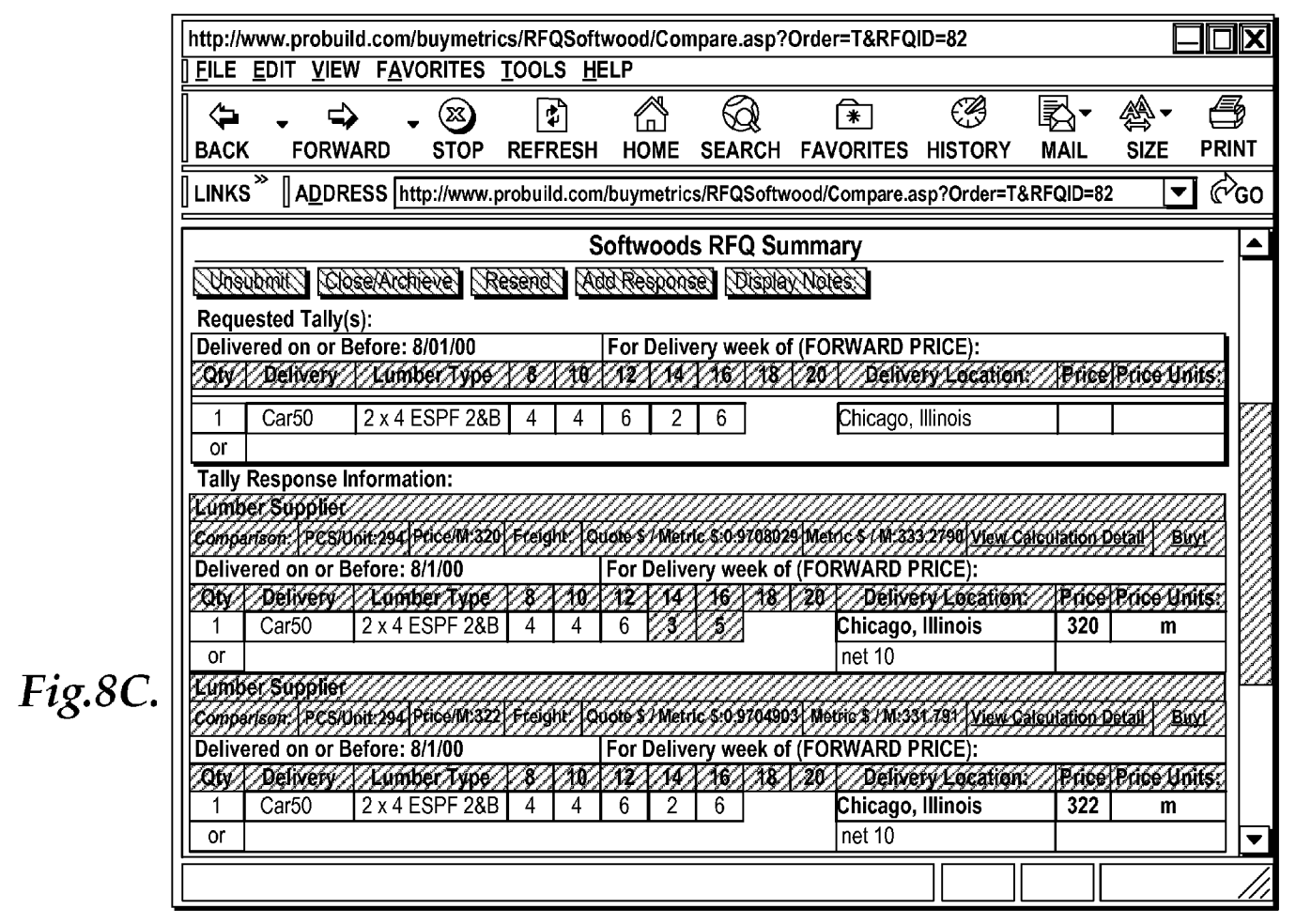

To display the quotes, the server 230 produces a Web page similar to that displayed in FIG. 8C, where the vendor's modified tally is displayed in highlighted text. The buyer can then view summary metric comparison or select the hypertext link "View Calculation Detail," which then invokes the server 230 to produce a Web page as shown in FIG. 8D. Referring now to the Web page illustrated in FIG. 8D, the data produced by server 230 compares the response to a selected metric of a different species, Western SPF (WSPF), for items of the same size, grade, and tally. The market price for the same 2×4 tally of ESPF and WSPF are thus simultaneously compared. In an example, Eastern quoted at $322 per thousand board feet, Western metric (Random Lengths™ Jun. 26, 2000 print price plus freight of $80 as defined in Metric Manager) for the same tally being $331.791. This metric comparison is also represented as Quote/Metric Value or Eastern price representing 0.970490, or 97% of comparable Western product.

In review of the normalization process, the buyer must select a metric source for price information for a defined item given a set of attributes, i.e., grade, species, and size. The metric may then be mapped to the RFQ item for comparison and does not have to be the equivalent of the item. For instance, as explained in the above-described example, it may be desirable to map the market relationship of one commodity item to another. The most current pricing data for the metric is electronically moved from the selected source to the server 230. As mentioned above, metrics may come from publicly available information, (i.e., price of futures contracts traded on the Chicago Mercantile Exchange), or subscription services, (i.e., Crowes™ or Random Lengths™ publications), or be an internal metric generated by the server 230. This metric data is used in the normalization process for all calculations, as described with reference to the above-described methods.

While various embodiments of the invention have been illustrated and described, it will be appreciated that within the scope of the appended claims, various changes can be made therein without departing from the spirit of the invention. For example, in an agricultural commodity, an order for Wheat U.S. #2 HRW could be compared to a selected metric of Wheat U.S. #2 Soft White, similar to how different species are analyzed in the above-described example.

The above system and method can be used to purchase other commodity items, such as in the trade of livestock. In such a variation, order information such as a lumber tally would be substituted for a meat type, grade, and cut. Other examples of commodity items include agricultural products, metals, or any other items of commerce having several order parameters.

The embodiments of the invention in which an exclusive property or privilege is claimed are defined as follows:

1. In a networked service provider environment, a computing system comprising:
   a service provider server comprising:
      a network interface;
      a memory storing computer-readable instructions; and
      a processor in communication with the network interface and the memory, wherein the processor is configured to execute the computer-readable instructions stored in the memory;
   a metric manager executable by the processor, wherein the metric manager is programmed to manage at least one evaluation service and a plurality of predefined instructions for adapting metric data; and
   a metric application operable in coordination with the metric manager, wherein the metric application is programmed to coordinate invocation of the at least one evaluation service including execution of one or more predefined instructions for adapting metric data that pertain to a user-agent and the at least one evaluation service, and to manage one or more interfaces that facilitate communications with the service provider server,
   wherein the metric application is further programmed to:
      receive, from a user-agent via a remotely located user-agent computing device, one or more product specification data sets, wherein each product specification data set identifies at least one item that is defined by two or more parameter values, or a plurality of items that differ in accordance with at least one parameter value; and
      for at least one item identified in a received product specification data set, invoke the at least one evaluation service to automatically generate one or more evaluation metrics for the item, wherein invoking the at least one evaluation service causes the metric application to:
         obtain metric data from at least one database or data source accessible to the processor, wherein the metric data comprises a plurality of market transaction data sets responsive to attributes of the at least one item identified in the product specification data set, wherein each market transaction data set is defined by at least one parameter value and represents market reference price data associated with the at least one item at a particular time or period of time, and wherein at least one item represented in at least one of the plurality of market transaction data sets differs by one or more parameter values from the at least one item identified in the product specification data set;

execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the at least one item as represented in one or more of the market transaction data sets that differ by at least one parameter value from the at least one item identified in the product specification data set, transforming the market reference price data associated with the at least one item and producing a plurality of normalized market reference price data sets for the at least one item identified in the product specification data set;

generate at least one synthetic market value for the at least one item identified in the product specification data set, wherein the market reference price data of the plurality of normalized market reference price data sets are input into at least one predefined algorithm associated with the at least one evaluation service to generate the at least one synthetic market value; and generate one or more evaluation metrics for the at least one item identified in the product specification data set based at least in part on the at least one synthetic market value, wherein the metric application is further programmed to manage at least one interface to communicate, via the network interface, the one or more evaluation metrics to at least the remotely located user-agent computing device from which the product specification data set was received.

2. The system of claim 1, wherein the at least one evaluation service is predefined and stored in the memory, and is invoked by the metric application in response to receiving, from the remotely located user-agent computing device, a product specification data set identifying at least one item for the at least one evaluation service.

3. The system of claim 2, wherein a plurality of evaluation services are predefined and stored in the memory, and selectively invoked by the metric application.

4. The system of claim 1, wherein invocation of the at least one evaluation service and/or execution of one or more predefined instructions that pertain to the at least one evaluation service causes the metric application to generate at least one evaluation metric for the at least one item identified in the product specification data set under multiple evaluation scenarios, wherein at least one evaluation scenario references an alternate item, alternate parameter, alternate time or period of time, alternate database or metric data source, or a combination thereof, or wherein at least one evaluation scenario causes the metric application to filter the normalized market reference price data sets using alternate criteria and/or evaluation parameters before generating the at least one synthetic market value for the at least one item, wherein the at least one evaluation metric generated for the at least one item under each of the multiple evaluation scenarios are compared, and wherein the metric application is further programmed to manage at least one interface to communicate a result of the comparison, via the network interface, to at least the remotely located user-agent computing device from which the product specification data set was received.

5. The system of claim 1, wherein the at least one synthetic market value and/or the one or more evaluation metrics generated based at least in part on the at least one synthetic market value for the at least one item identified in the product specification data set are further used by the metric application in one or more subsequent evaluation services.

6. The system of claim 5, wherein invocation of at least one subsequent evaluation service and/or execution of one or more predefined instructions that pertain to the at least one subsequent evaluation service causes the metric application to generate at least one evaluation metric comprising a predefined performance measure, wherein the at least one synthetic market value generated for the at least one item in the product specification data set or at least one of the evaluation metrics generated based at least in part on the at least one synthetic market value is a predefined data element that is automatically input into at least one predefined algorithm associated with the subsequent evaluation service to generate, at least in part, the predefined performance measure, and wherein the metric application is further programmed to manage at least one interface to communicate, via the network interface, the at least one evaluation metric to at least the remotely located user-agent computing device and/or at least one output specified in the one or more predefined instructions that pertain to the at least one evaluation service.

7. The system of claim 1, wherein the at least one product specification data set received from the user-agent computing device includes price data corresponding to the at least one item, and wherein invocation of the at least one evaluation service and/or execution of one or more predefined instructions that pertain to the at least one evaluation service further causes the metric application to divide the price data corresponding to the at least one item by the at least one synthetic market value generated for the at least one item, to generate at least one relative value metric comprising a ratio or index value for the at least one item, and to manage at least one interface to communicate the at least one relative value metric to at least the remotely located user-agent computing device from which the product specification data set was received.

8. The system of claim 1, wherein the market transaction data sets include market reference price data that was exposed by at least one buyer agent or at least one seller agent.

9. The system of claim 1, wherein one or more of the market transaction data sets include market reference price data that was previously gathered in one or more databases and exposed to the processor by a third party via the network interface.

10. The system of claim 1, wherein the metric application is programmed to manage one or more visual interfaces to communicate the one or more evaluation metrics generated for the at least one item identified in the product specification data set to the remotely located user-agent computing device for visual display in the form of a table, chart, or graph.

11. The system of claim 10, wherein the metric application is programmed to manage one or more visual interfaces to communicate the one or more evaluation metrics to the remotely located user-agent computing device, and wherein the metric application is further programmed to manage multiple visual interfaces that can be alternatively or simultaneously displayed, wherein the multiple visual interfaces facilitate interactions that enable a user agent to expose underlying data in one or more layers of detail or to display additional linked information or the same data presented in a different format or as determined over a different period of time.

12. The system of claim 1, wherein the metric application in coordination with the metric manager is programmed to manage at least one interface that enables a user-agent computing device to predefine and add a new evaluation service or to modify a predefined evaluation service or to join two or more predefined evaluation services to form a combined evaluation service, and wherein the new, modified, or combined evaluation service is invoked by the metric application when at least one product specification data set is received from the remotely located user-agent computing device for the new, modified, or combined evaluation service.

13. The system of claim 1, wherein invocation of the at least one evaluation service and/or execution of one or more predefined instructions that pertain to the at least one evaluation service causes the metric application in coordination with the metric manager to manage an interface wherein the user-agent computing device is prompted to identify or select at least one data element or function to be added to or removed from a currently in-progress evaluation service, or to provide additional information required by the currently in-progress evaluation service, thereby modifying the evaluation service, and wherein upon instruction the metric manager is further configured to store the modified evaluation service for re-use by the user-agent computing device.

14. The system of claim 1, wherein the metric application in coordination with the metric manager is programmed to manage at least one interface that enables a user-agent computing device to predefine and associate one or more instructions for adapting metric data with a specific item, a specific database or source of metric data, a specific parameter, and/or a specific event.

15. The system of claim 1, wherein the metric application in coordination with the metric manager is programmed to manage at least one interface that enables a user-agent computing device to predefine one or more instructions for adapting metric data that further associate a specific item with one or more other items, item attributes, parameters, databases or sources of metric data, or events, and/or with one or more other predefined instructions, and collectively form a compound, grouped, or multi-variant data element.

16. The system of claim 15, wherein the at least one interface further enables the user-agent computing device to predefine and associate a unique label or code with the compound, grouped, or multi-variant data element, wherein upon identification of the unique label or code, the metric application automatically executes the one or more predefined instructions associated with the item.

17. The system of claim 1, wherein the metric manager is further programmed to manage predefined instructions that include one or more dynamic or conditional rules, variables, or criteria, including:
one or more formulas operationally combining elements and using variables relating to a plurality of items, parameters, events, databases or metric data sources, synthetic market values, or evaluation metrics;
a combination of rules, variables, or criteria relating to a plurality of items, parameters, events, databases or metric data sources, synthetic market values, or evaluation metrics, the execution of which may be conditional, priority weighted, sequential, recursive, or subject to another prespecified method of control;
a combination of evaluation services, wherein at least one evaluation service is combined with at least one predefined instruction that specifies employing a process step, action, function, or subroutine, and/or combined with at least one other evaluation service, the execution of which may be conditional, priority weighted, sequential, recursive, or subject to another prespecified method of control; or
one or more validation rules relating to a plurality of items, parameters, events, databases or metric data sources, market transaction data sets, normalized market price data sets, synthetic market values, or evaluation metrics, the execution of which may be conditional, priority weighted, recursive, or subject to another prespecified method of control.

18. The system of claim 1, wherein the metric application in coordination with the metric manager is programmed to manage at least one interface that enables a user-agent computing device to predefine for exclusive use by the user-agent at least one instruction for adapting metric data or to modify at least one previously predefined instruction for adapting metric data, and to store the at least one predefined or modified instruction for execution when the at least one evaluation service is invoked by the metric application in response to receiving a product specification data set from the user-agent computing device.

19. The system of claim 18, wherein one or more of the instructions for adapting metric data predefined or modified by the user-agent computing device, when executed, cause the metric application in coordination with the metric manager to apply at least one predefined method, formula, or algorithm that was preassociated with a specific item, a specific source of metric data, a specific parameter, a specific event, or a combination thereof, to the market reference price data of at least one market transaction data set before generating the at least one synthetic market value for the at least one item in the product specification data set.

20. The system of claim 18, wherein one or more of the instructions for adapting metric data that are predefined or modified by the user-agent computing device instruct the metric application to obtain metric data for an alternate item, alternate parameter, or market transaction data from an alternate source, for at least one item identified in the product specification data set.

21. The system of claim 18, wherein at least a subset of the instructions for adapting metric data predefined by the user-agent computing device are applicable to a plurality of user-agents, wherein at least one computing device is designated as an administrator for the predefined or modified instructions that apply to the plurality of user-agents and the at least one evaluation service.

22. The system of claim 21, wherein the at least one computing device designated as the administrator is under control of a service provider, a cooperative, an institution, an organization, or a self-affiliated pool of user-agents.

23. The system of claim 18, wherein the at least one synthetic market value and/or the one or more evaluation metrics generated for the at least one item represents market information that was pre-adapted for exclusive use by the user-agent computing device, wherein the pre-adapting served to enhance the performance of one or more applications running on one or more computing devices under control of the user-agent by reducing time required to adapt, reverse engineer, de-normalize, or reconfigure third-party market information for use by the one or more applications, improving speed of availability and relevance of the market information available for immediate use by the user-agent.

24. The system of claim 1, wherein the metric application in coordination with the metric manager is programmed to manage at least one interface that enables a user-agent computing device to predefine or preselect one or more methods or algorithms to be applied using the price data of the plurality of normalized market reference price data sets to generate the at least one synthetic market value and to associate the one or more methods or algorithms with at least one evaluation service, and wherein at least one of the predefined or preselected methods or algorithms comprises a replicable mathematical process for determining a mean value, a median value, or variation of a mean or median.

25. The system of claim 1, wherein invocation of the at least one evaluation service and/or execution of one or more predefined instructions that pertain to the at least one evaluation service causes the metric application to generate the at least one synthetic market value for the at least one item identified in the product specification data set by generating a volume-weighted average value for the item using data values associated with the item in the plurality of normalized market price data sets.

26. The system of claim 1, wherein invocation of the at least one evaluation service execution one or more of the predefined instructions that pertain to the at least one evaluation service causes the metric application to apply a temporal function that causes the metric application to automatically generate the at least one synthetic market value and the one or more evaluation metrics for the at least one item identified in the product specification data set continuously, at a predefined time, over a predefined interval of time, or upon occurrence of a predefined event, wherein an interval of time can include a continuously sliding interval of time that represents a most current period of time.

27. The system of claim 1, wherein the at least one evaluation service or one or more of the predefined instructions that pertain to the at least one evaluation service causes the metric application to apply one or more predefined validation rules and/or statistical criteria that must be satisfied by (1) the obtained market transaction data sets or the normalized market reference price data sets, and/or (2) the at least one synthetic market value generated from the price data of the plurality of normalized market reference price data sets, before the one or more evaluation metrics are generated for the at least one item identified in the product specification data set.

28. The system of claim 27, wherein each of the plurality of normalized market reference price data sets is determined to satisfy the one or more predefined validation rules and/or statistical criteria and is used, or is determined to not satisfy the one or more predefined validation rules and/or statistical criteria and is excluded from use, before generating the at least one synthetic market value.

29. The system of claim 1, wherein invocation of the at least one evaluation service and/or execution of one or more predefined instructions that pertain to the at least one evaluation service causes the metric application to evaluate the data of the plurality of normalized market reference price data sets for collective satisfaction of one or more predefined validation rules and/or statistical criteria before generating the at least one synthetic market value for the at least one item identified in the product specification data set, wherein the one or more predefined validation rules and/or statistical criteria consider at least one of: total volume in units per item per period of time specified; frequency/liquidity of the market transaction data sets; concentration/fragmentation of the market transaction data sets by source of the transaction data; or concentration/fragmentation of the market transaction data sets by the type of transaction.

30. The system of claim 1, wherein one or more of the parameter values identified with the at least one item in the product specification data set or in an obtained market transaction data set pertain to a grade, a rating measure, a species, an item type, a brand, a quantity, a size, a unit of measure, a tally, a location, a method of delivery, a delivery date, a time of service, a warranty, a payment term, or a transaction type.

31. The system of claim 30, wherein a delivery date or time of service identified in the product specification data set or in an obtained market transaction data set specifies one or more fulfillment dates in the future.

32. The system of claim 1, wherein the metric application is programmed to ascertain the parameter values of the at least one item represented in each obtained market transaction data set to determine if any of the predefined instructions that pertain to the at least one evaluation service are applicable to the obtained market transaction data set.

33. The system of claim 1, wherein at least one of the plurality of market transaction data sets includes market reference price data for an item that is non-fungible in that the item is not a perfect substitute for the at least one item identified in the product specification data set, wherein execution of the one or more predefined instructions causes the metric application to generate and apply at least one adjustment value to the market reference price data for the non-fungible item, and wherein the resulting transformation of the market reference price data occurs independent of unit-of-measure conversion of data in the market transaction data sets defined by a unit-of-measure.

34. The system of claim 1, wherein the metric data comprises a plurality of market transaction data sets obtained from two or more different databases or data sources, and wherein the transformation of the market reference price data associated with the at least one item as represented in one or more of the market transaction data sets that differ by at least one parameter value from the at least one item identified in the product specification data set occurs independent of unit-of-measure conversion of data in the market transaction data sets defined by a unit-of-measure.

35. The system of claim 1, wherein invocation of the at least one evaluation service and/or execution of one or more predefined instructions that pertain to the at least one evaluation service causes the metric application to generate and apply at least one adjustment value to at least one obtained market transaction data set for each of the one or more parameter values that differ from the at least one item identified in the product specification data set, wherein the adjustment value serves to minimize a difference between the market transaction data set with the differing parameter and (1) an average of responsive market transaction data sets over the particular period of time, or (2) an average of a control group of market transaction data sets, and wherein the at least one adjustment value is generated using a least squares or similar curve-fit algorithm and applied to the price data associated with the at least one item in the market transaction data set.

36. The system of claim 35, wherein the at least one parameter that differs pertains to a location, and wherein the applied adjustment value generated by the metric application for the differing location parameter is not determined by calculating a point-to-point cost of freight to transport the item from the location identified in the market transaction data set to the location identified in the product specification data set.

37. The system of claim 1, wherein execution of at least one predefined instruction that pertains to the at least one evaluation service causes the metric application to generate the at least one synthetic market value for the at least one item based, at least in part, on a formula, rule, or correlation that is applied to market transaction price data for at least one other item, wherein the at least one other item is a different item or differs by at least one parameter value from the at least one item identified in the product specification data set.

38. The system of claim 1, wherein at least one received product specification data set identifies a plurality of items that are to be evaluated as a bundled item or wherein at least one item identified in the product specification data set is a combined item that represents a bundled product, a tally, a list, or an assembly of one or more component parts, wherein the bundled or combined item is offered or sold for a single price, and wherein invocation of the at least one evaluation service and/or execution of one or more predefined instructions that pertain to the at least one evaluation service causes the metric application to:

for each item or component part of the bundled or combined item, obtain metric data from the at least one database or data source, wherein the metric data comprises a plurality of market transaction data sets responsive to attributes of the item or component part, wherein each market transaction data set is defined by at least one parameter value and represents market reference price data associated with at least one item or component part at a particular time or period of time, and wherein at least one item or component part represented in at least one of the plurality of market transaction data sets differs by one or more parameter values from the at least one item or component part of the bundled or combined item identified in the product specification data set;

execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the item or component part as represented in one or more of the market transaction data sets that differ by at least one parameter value from the item or component part identified in the product specification data set, transforming the market reference price data associated with the at least one item or component part, and producing a plurality of normalized market reference price data sets for the at least one item or component part;

generate at least one synthetic market value for the at least one item or component part, wherein the market reference price data in the plurality of normalized market reference price data sets are input into at least one predefined algorithm associated with the at least one evaluation service to generate the at least one synthetic market value for the at least one item or component part of the bundled or combined item;

generate one or more evaluation metrics for the bundled or combined item based at least in part on the at least one synthetic market value generated for each item or component part of the bundled or combined item, wherein the metric application is further programmed to manage at least one interface to communicate, via the network interface, the one or more evaluation metrics for the bundled or combined item to at least the remotely located user-agent computing device from which the product specification data set was received.

39. The system of claim 38, wherein invocation of the at least one evaluation service and/or execution of one or more predefined instructions that pertain to the at least one evaluation service causes the metric application to generate at least one evaluation metric for the bundled or combined item identified in the product specification data set under multiple evaluation scenarios, wherein at least one evaluation scenario references an alternate item or component part, alternate parameter, alternate time or period of time, alternate database or metric data source, or combination thereof, or wherein at least one evaluation scenario causes the metric application to filter the normalized market reference price data sets using alternate criteria and/or evaluation parameters before generating the at least one synthetic market value for the bundled or combined item, wherein the at least one evaluation metric generated for the bundled or combined item under the multiple evaluation scenarios are compared, and wherein the metric application is further programmed to manage at least one interface to communicate a result of the comparison, via the network interface, to at least the remotely located user-agent computing device from which the product specification data set was received.

40. The system of claim 1, wherein invocation of the at least one evaluation service and/or execution of one or more predefined instructions that pertain to the at least one evaluation service causes the metric application to automatically query one or more databases or data sources accessible to the processor of the service provider server or to monitor one or more data streams to obtain at least one market transaction data set responsive to attributes of at least one item identified in the product specification data set, and wherein the querying or monitoring occurs continuously, at a predefined time, over a predefined interval of time, or upon occurrence of a predefined event.

41. The system of claim 1, wherein execution of at least one predefined instruction that pertains to the at least one evaluation service causes the metric application to filter each of the normalized market reference price data sets for inclusion or exclusion using one or more predefined control values, criteria, and/or parameter values, before generating the at least one synthetic market value for the at least one item identified in the product specification data set.

42. The system of claim 1, wherein execution of at least one predefined instruction that pertains to the at least one evaluation service causes the metric application to rank or sort the plurality of normalized market reference price data sets using one or more predefined control values, criteria, and/or parameter values, and to generate the at least one synthetic market value for the at least one item identified in the product specification data set using only data associated with a sorted segment or ranked portion of the normalized market reference price data sets.

43. The system of claim 42, wherein the sorted segment includes only the market reference price data of the plurality of normalized price data sets representing the latest time or period of time, or wherein the ranked portion includes only the market reference price data of the plurality of normalized price data sets representing the lowest normalized price data for the at least one item identified in the product specification data set.

44. The system of claim 1, wherein invocation of the at least one evaluation service and/or execution of one or more predefined instructions that pertain to the at least one evaluation service causes the metric application to limit the metric data to be obtained to market transaction data sets exposed at a predefined time, over at least one predefined interval of time, or upon occurrence of a predefined event, wherein a predefined interval of time can include a continuously sliding interval of time that represents a most current period of time.

45. The system of claim 1, wherein execution of at least one predefined instruction that pertains to the at least one evaluation service causes the metric application to filter the market transaction data sets and use only market transaction data sets that resulted in a purchase or a contract to generate the at least one synthetic market value for the at least one item identified in the product specification data set.

46. The system of claim 1, wherein the product specification data set includes a quantity value for the at least one item and the normalized market reference price data sets comprise a normalized value per unit for the at least one item, and wherein generating the at least one synthetic market value for the at least one item comprises generating a synthetic market value per unit for the item that is multiplied by the quantity value identified for the at least one item in the product specification data set.

47. The system of claim 1, wherein invocation of the at least one evaluation service and/or execution of one or more predefined instructions that pertain to the at least one evaluation service causes the metric application to convert data denoted by one or more units of measure into standardized or common units of measure prior to generating the at least one synthetic market value for the at least one item identified in the product specification data set, and wherein after generating the at least one synthetic market value for the at least one item in the product specification data set, the metric application is further caused to reconvert the resulting data values back into the units of measure denoted for the at least one item in the product specification data set before generating the one or more evaluation metrics for the at least one item, and to manage at least one interface to communicate the one or more evaluation metrics to the remotely located user-agent computing device from which the product specification data set was received.

48. The system of claim 1, wherein invocation of the at least one evaluation service and/or execution of one or more predefined instructions that pertain to the at least one evaluation service causes the metric application to consistently convert data expressed in units of measure into one of the following:
   (1) standardized or common units of measure;
   (2) units of measure specified for the at least one item in the one or more predefined instructions; or
   (3) units of measure specified for the at least one item in the product specification data set,
   and to only generate the at least one synthetic market value for the at least one item identified in the product specification data set using data possessing consistent units of measure.

49. The system of claim 1, wherein the metric application is further programmed to manage at least one interface that facilitates an integrated data exchange between the processor of the service provider server and at least one application running on a remotely located user-agent computing device or facilitates an integrated data exchange with at least one other computing device in communication with the service provider server via the network interface, and to execute movement of data in an integrated data exchange.

50. The system of claim 49, wherein invocation of the at least one evaluation service and/or execution of one or more predefined instructions that pertain to the at least one evaluation service causes the metric application to manage at least one interface to facilitate data communication in XML format, wherein the metric application is able to dynamically change, dynamically route, and/or pre-configure the data for movement of the data in the integrated data exchange.

51. The system of claim 1, wherein invocation of the at least one evaluation service and/or execution of one or more predefined instructions that pertain to the at least one evaluation service causes the metric application to automatically update the one or more evaluation metrics previously generated for the at least one item identified in the product specification data set, continuously, at a predefined time, over a predefined interval of time, or upon occurrence of a predefined event, wherein said causing the metric application to automatically update the one or more evaluation metrics comprises causing the metric application to:
   obtain more-current metric data from at least one database or data source accessible to the processor, wherein the more-current metric data comprises an updated plurality of market transaction data sets responsive to attributes of the at least one item identified in the product specification data set, wherein the updated plurality of market transaction data sets includes at least one more-current market transaction data set or excludes at least one previously-obtained market transaction data set that is no longer responsive to the at least one item or no longer represents market reference price data associated with the at least one item at a particular time or period of time;
   execute the one or more predefined instructions for adapting metric data that pertain to the at least one evaluation service as applicable to each of the market transaction data sets in the updated plurality of market transaction data sets, wherein execution of the one or more predefined instructions causes at least one adjustment value to be generated and applied to the market reference price data associated with the at least one item as represented in one or more of the market transaction data sets that differ by at least one parameter value from the at least one item identified in the product specification data set, transforming the market reference price data associated with the at least one item, and producing a plurality of more-current normalized market reference price data sets for the at least one item;
   generate at least one updated synthetic market value for the at least one item, wherein the market reference price data of the plurality of more-current normalized market reference price data sets are input into the at least one predefined algorithm associated with the at least one evaluation service to generate the at least one updated synthetic market value; and
   generate one or more updated evaluation metrics for the at least one item identified in the product specification data set based at least in part on the at least one updated synthetic market value,
   wherein the metric application is further programmed to manage at least one interface to communicate, via the network interface, the one or more updated evaluation metrics to at least the remotely located user-agent computing device from which the product specification data set was received.

52. The system of claim 51, wherein invocation of the at least one evaluation service and/or execution of one or more predefined instructions that pertain to the at least one evaluation service causes the metric application to update the at least one synthetic market value of the at least one item and/or the one or more evaluation metrics based at least in part on the synthetic market value in real-time or near real-time.

53. The system of claim 51, wherein the at least one evaluation service or one or more of the predefined instructions that pertain to the at least one evaluation service specify one or more validation rules and/or statistical criteria to be satisfied before the one or more updated evaluation metrics are generated and communicated, via the network interface, to at least the user-agent computing device.

54. The system of claim 51, wherein at least one of the evaluation metrics is a comparative metric, wherein invocation of the at least one evaluation service and/or execution of one or more predefined instructions that pertain to the at least one evaluation service causes the metric application to compare the one or more updated evaluation metrics for the at least one item to one or more previously-generated evaluation metrics, a predefined base market value, or one or more third-party reported market values for the at least one item, to generate at least one comparative metric for the at least one item and to manage at least one interface to communicate the comparative metric to at least the remotely located user-agent computing device.

55. The system of claim 54, wherein the at least one comparative metric comprises a ratio or index value generated by dividing the one or more updated evaluation metrics for the at least one item by the one or more previously-generated evaluation metrics, a predefined base market value, or one or more third-party reported market values for the at least one item.

56. The system of claim 54, wherein the metric application is programmed to manage one or more visual interfaces to communicate the at least one comparative metric to the remotely located user-agent computing device for visual display in the form of a table, chart, or graph.

57. The system of claim 56, wherein the metric application is programmed to manage multiple visual interfaces that can be alternatively or simultaneously displayed, and wherein the multiple visual interfaces facilitate interactions that enable a user-agent to expose underlying data in one or more layers of detail, or to display additional linked information or the same data presented in a different format or as determined over a different period of time.

58. The system of claim 1, wherein invocation of the at least one evaluation service and/or execution of one or more predefined instructions that pertain to the at least one evaluation service causes the metric application to apply at least one predefined validation rule and/or statistical criteria that must be satisfied before the one or more evaluation metrics are generated for the at least one item, and further causes the metric application to measure a deviation of the at least one synthetic market value generated for the at least one item from a previously-generated synthetic market value or a predefined base market value for the at least one item, wherein exceeding a predefined threshold deviation from the previously-generated synthetic market value or the predefined base market value for the at least one item causes the metric application to regenerate the synthetic market value using the same and/or at least one preselected alternate evaluation service before generating the one or more evaluation metrics for the at least one item, and/or to determine based on the at least one predefined validation rule or statistical criteria whether to invalidate the at least one synthetic market value or to generate an alert or to flag at least one evaluation metric generated based at least in part on the synthetic market value as falling outside the predefined threshold deviation when communicating, via the network interface, the one or more evaluation metrics to at least the remotely located user-agent computing device from which the product specification data set was received.

59. The system of claim 1, wherein the metric application is further programmed to produce documentation that enables an audit of the one or more evaluation metrics generated for at least one item identified in the product specification data set, wherein the metric application in coordination with the metric manager is programmed to document the data and process steps used by the at least one evaluation service to generate each evaluation metric by replicating the process steps of the at least one evaluation service using the data that was previously associated with and used in each process step, and to manage at least one interface to communicate, via the network interface, the documentation for the one or more evaluation metrics generated for the at least one item identified in the product specification data set to the remotely located user-agent computing device and/or at least one output specified in the one or more predefined instructions that pertain to the at least one evaluation service.

60. The system of claim 1, wherein the metric application is programmed to manage at least one interface that enables the remotely located user-agent computing device to trigger an event that causes the metric application to manage an interface wherein the user-agent computing device is prompted to identify or select at least one data element or function to be added to a currently in-progress evaluation service or to remove a data element or function from the currently in-progress evaluation service, modifying at least one evaluation service currently in-progress for the at least one item identified in the product specification data set.

61. The system of claim 1, wherein the metric application in coordination with the metric manager is further programmed to impute one or more item attributes, parameters, or associations using one or more mathematical or statistical processes applied using at least one known item, attribute, parameter identified in the product specification data set, or one or more instructions previously received from the remotely located user-agent computing device.

62. The system of claim 1, wherein the at least one synthetic market value and/or the one or more evaluation metrics generated for the at least one item is a synthetic value that represents market information usable by the user-agent computing device from which the product specification data set was received, wherein invocation of the at least one evaluation service and/or execution of one or more instructions predefined by the user-agent computing device causes the metric application to manage at least one interface that facilitates an integrated data exchange between the processor of the service provider server and one or more applications running on at least one remotely located computing device under control of the user-agent, wherein the interface enables the one or more applications running on the remotely located user-agent computing device to identify at least one product specification data set that includes at least one item defined by two or more parameter values, or a plurality of items that differ in accordance with at least one parameter value, and wherein receipt of the product specification data set causes the metric application to invoke at least one evaluation service and/or execute one or more predefined instructions that pertain to the at least one evaluation service to automatically generate at least one evaluation metric for the at least one item and to manage at least one interface to facilitate an integrated data exchange wherein the at least one evaluation metric is communicated, via the network interface, to the one or more applications running on the remotely located user-agent computing device from which the product specification data set was received.

63. The system of claim 1, wherein the at least one synthetic market value or the one or more evaluation metrics generated based at least in part on the at least one synthetic market value for the at least one item identified in the product specification data set comprises a synthetic value that represents market information and does not represent price data associated with an actual bid or offer-to-sell.

64. The system of claim 1, further comprising storing at least a subset of data received by the service provider server or generated by the service provider server in one or more databases accessible to the processor of the service provider server.

65. The system of claim 1, wherein the memory of the service provider server further includes computer-executable instructions that, when executed by the processor, provide a multi-value cross-compilation tool configured to manage interactions with data stored in one or more databases accessible to the processor.

66. The system of claim 1, wherein invocation of the at least one evaluation service and/or execution of one or more predefined instructions that pertain to the at least one evaluation service causes the metric application to expose, to at least one tracking system, at least a subset of the data received or generated by the service provider server responsive to the at least one item identified in the product specification data set.

67. The system of claim 1, wherein the metric application is further programmed to manage one or more interfaces to control one or more preprogrammed utilities or functions running on the service provider server or the remotely located user-agent computing device that pertain to the at least one evaluation service currently invoked by the metric application, including launching or closing of a preprogrammed utility or function, and to execute movement of data in an integrated data exchange between the service provider server and at least one preprogrammed utility or function, wherein the one or more preprogrammed utilities or functions include at least one of a calculator, a unit-of-measure converter, a load building/sizing utility, a production planning utility, a requisition/purchase authorization utility, a print utility, a calendar, or a regulatory or certification process.

68. The system of claim 1, wherein the metric application is programmed to coordinate invocation of subroutines of the at least one evaluation service and/or multiple evaluation services, in parallel, in combination, or sequentially.

69. The system of claim 1, wherein invocation of the at least one evaluation service and/or execution of one or more predefined instructions that pertain to the at least one evaluation service causes the metric application to obtain only metric data resulting from a computer-based interaction and comprising electronically created market transaction data sets.

70. The system of claim 69, wherein the market reference price data further does not include human-reported transaction data or transaction data that was manually transcribed into a digital format.

71. The system of claim 1, wherein invocation of the at least one evaluation service and/or execution of one or more predefined instructions that pertain to the at least one evaluation service causes the metric application to generate at least one smoothed evaluation metric for the at least one item identified in the product specification data set, wherein the at least one synthetic market value generated for the at least one item in the product specification data set and one or more earlier-generated synthetic market values for the item are input into at least one predefined algorithm associated with the evaluation service to generate at least one smoothed synthetic market value for the at least one item identified in the product specification data set, and wherein the at least one smoothed evaluation metric is generated based at least in part on the at least one smoothed synthetic market value.

72. The system of claim 1, wherein invocation of the at least one evaluation service and/or execution of one or more predefined instructions that pertain to the at least one evaluation service causes the metric application to manage at least one interface that enables a remotely-located user-agent computing device to identify at least one source for metric data, wherein the metric data comprises a plurality of historical price data sets for the at least one item identified in the product specification data set and/or historical price data associated with the user-agent computing device from which the product specification data set was received, and to identify at least one predefined algorithm,
wherein invocation of the at least one evaluation service and/or execution of one or more predefined instructions for adapting metric data that pertain to the at least one evaluation service further causes the metric application to obtain the metric data from the identified source and to execute one or more predefined instructions as applicable to adapt each of the historical price data sets in the plurality of historical price data sets, wherein execution of the one or more predefined instructions causes at least one adjustment value to be generated and applied to the historical price data associated with the at least one item identified in the product specification data set, transforming the historical price data associated with the at least one item, and to generate at least one evaluation metric using the transformed historical price data sets, wherein the historical price data are input into the at least one predefined algorithm to generate the at least one evaluation metric, and wherein the metric application is further programmed to manage at least one interface to facilitate communication of the at least one evaluation metric to at least the remotely located user-agent computing device from which the product specification data set was received.

73. The system of claim 1, wherein the obtained metric data was automatically exposed, via the network interface, to the processor by the at least one database or data source, wherein the exposing occurred without prompting by the processor.

74. The system of claim 1, wherein the one or more evaluation metrics are generated without using a predictive model, wherein the data values associated with the at least one item identified in the product specification data set are not input into a pre-constructed model that produces a predictable outcome.

75. In a networked service provider environment, a computing system comprising:
a service provider server comprising:
a network interface;
a memory storing computer-readable instructions; and
a processor in communication with the network interface and the memory, wherein the processor is configured to execute the computer-readable instructions stored in the memory;
a metric manager executable by the processor, wherein the metric manager is programmed to manage at least one evaluation service and a plurality of predefined instructions for adapting metric data; and
a metric application operable in coordination with the metric manager, wherein the metric application is programmed to coordinate invocation of the at least one evaluation service including execution of one or more predefined instructions for adapting metric data that pertain to a buyer-agent and the at least one evaluation service, and to manage one or more interfaces that facilitate communications with the service provider server,
wherein the metric application is further programmed to:
receive, from a buyer-agent via a remotely located buyer-agent computing device, one or more product specification data sets, wherein each product specification data set identifies at least one item that is defined by two or more parameter values, or a plurality of items that differ in accordance with at least one parameter value; receive a plurality of price data sets responsive to at least one item identified in the product specification data sets, and wherein each price data set includes price data representing an offer and identifies at least one item that is defined by one or more parameter values; and for each received price data set, invoke the at least one evaluation service to automatically generate one or more evaluation metrics for the at least one item identified in the price data set, wherein invoking the at least one evaluation service causes the metric application to:

obtain metric data from at least one database or data source accessible to the processor, wherein the metric data comprises a plurality of market transaction data sets responsive to attributes of the at least one item identified in the price data set, wherein each market transaction data set is defined by at least one parameter value and represents market reference price data associated with at least one item at a particular time or period of time, and wherein at least one item identified in one or more of the plurality of market transaction data sets differs by one or more parameter values from the at least one item identified in the price data set;

execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the at least one item identified in one or more of the market transaction data sets that differ by at least one parameter value from the at least one item identified in the price data set, transforming the market reference price data associated with the at least one item and producing a plurality of normalized market reference price data sets for the at least one item identified in the price data set;

generate at least one synthetic market value for the at least one item identified in the price data set, wherein the market reference price data of the plurality of normalized market reference price data sets are input into at least one predefined algorithm associated with the at least one evaluation service to generate the at least one synthetic market value; and generate one or more evaluation metrics for the at least one item identified in the price data set based at least in part on the at least one synthetic market value, wherein each of the one or more evaluation metrics generated for the at least one item in each of the plurality of received price data sets provides an objective measure with which to compare the at least one item across the plurality of price data sets, and wherein the metric application is further programmed to manage at least one interface to communicate, via the network interface, at least a subset of the received price data sets and the one or more evaluation metrics generated for the at least one item identified in the respective price data sets to at least the remotely located buyer-agent computing device from which the product specification data set was received.

76. The system of claim 75, wherein invocation of the at least one evaluation service and/or execution of one or more predefined instructions that pertain to the at least one evaluation service causes the metric application to divide the price data for the at least one item identified in the price data set by the at least one synthetic market value generated for the at least one item, to generate a relative value metric comprising a ratio or index value.

77. The system of claim 76, wherein the relative value metric summarily measures a multi-parameter relationship of the price data identified for the at least one item in the price data set to the at least one synthetic market value generated for the at least one item in a single measure, wherein a relative value metric of less than one (<1.0) is indicative of a price less than the item's synthetic market value, and a relative value metric greater than one (>1.0) is indicative of a price higher than the item's synthetic market value.

78. The system of claim 76, wherein invocation of the at least one evaluation service and/or execution of one or more predefined instructions that pertain to the at least one evaluation service causes the metric application to sort and/or rank a plurality of received price data sets by the relative value metric generated for the at least one item identified in each price data set.

79. The system of claim 78, wherein execution of one or more instructions predefined by the buyer-agent computing device that pertain to the at least one evaluation service cause the metric application to automatically transmit on behalf of the buyer-agent a purchase notice to the at least one seller-agent providing at least one price data set with the lowest relative value metric for the at least one item identified in the product specification data set.

80. The system of claim 79, wherein the metric application is programmed to manage at least one interface that facilitates an integrated data exchange between the processor of the service provider server at least one application running on the at least one remotely located seller-agent computing device in communication with the service provider server via a network interface, and to automatically execute movement of the purchase notice in an integrated data exchange.

81. The system of claim 76, wherein at least one item identified in at least one of the plurality of received price data sets is not a perfect substitute for the same item as identified in another price data set in that the item varies by one or more parameter values from the same item identified in another price data set, and wherein the relative value metric generated for the at least one item identified in each price data set provides an objective measure with which to compare the at least one item across the plurality of price data sets, including price data sets possessing unequal parameter values.

82. The system of claim 76, wherein invocation of the at least one evaluation service and/or execution of one or more predefined instructions pertaining to the at least one evaluation service causes the metric application to automatically generate an updated relative value metric for the at least one item in the at least one price data set by dividing the price data for the item identified in the price data set by at least one updated synthetic market value generated for the at least one item in the price data set.

83. The system of claim 76, wherein invocation of the at least one evaluation service and/or execution of one or more predefined instructions that pertain to the at least one evaluation service causes the metric application to trigger an automatic alert to be communicated to one or more outputs in response to the relative value metric exceeding or falling below a predefined trigger value, wherein the predefined trigger value is expressed as a numerical value, a percent of change, or a ratio or index value.

84. The system of claim 75, wherein invocation of the at least one evaluation service and/or execution of one or more predefined instructions that pertain to the at least one evaluation service causes the metric application to sort and/or rank a plurality of received price data sets by at least one of the one or more evaluation metrics generated for the at least one item identified in each price data set.

85. The system of claim 75, wherein the market transaction data sets include market reference price data that was exposed by at least one buyer agent or at least one seller agent.

86. The system of claim 75, wherein the at least one synthetic market value and/or the one or more evaluation metrics generated based at least in part on the at least one synthetic market value for the at least one item identified in the price data set are further used by the metric application in one or more subsequent evaluation services.

87. The system of claim 86, wherein invocation of at least one subsequent evaluation service and/or execution of one or more predefined instructions that pertain to the at least one subsequent evaluation service causes the metric application to generate at least one evaluation metric comprising a predefined performance measure, wherein the at least one synthetic market value generated for the at least one item identified in the price data set or at least one of the one or more evaluation metrics generated for the at least one item based at least in part on the at least one synthetic market value is a predefined data element that is automatically input into at least one predefined algorithm associated with the subsequent evaluation service to generate, at least in part, the predefined performance measure, and to manage at least one interface to communicate via the network interface the at least one evaluation metric to at least the remotely located buyer-agent computing device and/or at least one output specified in the one or more predefined instructions that pertain to the at least one evaluation service.

88. The system of claim 75, wherein the at least one evaluation service is predefined and stored in the memory, and invoked by the metric application in response to receiving, from the remotely located buyer-agent computing device, a product specification data set identifying at least one item for the at least one evaluation service.

89. The system of claim 75, wherein invocation of the at least one evaluation service and/or execution of one or more predefined instructions that pertain to the at least one evaluation service causes the metric application to generate at least one evaluation metric for the at least one item identified in the price data set under multiple evaluation scenarios, wherein at least one evaluation scenario references an alternate item, alternate parameter, alternate time or period of time, alternate database or metric data source, or a combination thereof, or wherein at least one evaluation scenario causes the metric application to filter the normalized market reference price data sets using alternate criteria and/or evaluation parameters before generating the at least one synthetic market value for the at least one item, wherein the at least one evaluation metric generated for the at least one item under each of the multiple evaluation scenarios are compared, and wherein the metric application is further programmed to manage at least one interface to communicate the price data set and the result of the comparison, via the network interface, to at least the remotely located buyer-agent computing device from which the product specification data set was received.

90. The system of claim 75, wherein the metric application is programmed to manage one or more visual interfaces to display the one or more evaluation metrics generated for the at least one item identified in one or more of the plurality of price data sets to at least the remotely located buyer-agent computing device from which the product specification data set was received.

91. The system of claim 90, wherein the metric application is programmed to manage at least one visual interface to facilitate interactions that enable a buyer-agent to expose underlying data in one or more layers of detail, or to display additional linked information or the same data presented in a different format or as determined over a different period of time.

92. The system of claim 75, wherein the metric application in coordination with the metric manager is programmed to manage at least one interface that enables a buyer-agent computing device to predefine and associate one or more instructions for adapting metric data with a specific item, a specific database or source of metric data, a specific seller-agent, a specific parameter, and/or a specific event.

93. The system of claim 75, wherein the metric application in coordination with the metric manager is programmed to manage at least one interface that enables a buyer-agent computing device to predefine one or more instructions for adapting metric data that further associate a specific item with one or more other items, item attributes, parameters, seller-agents, databases or sources of metric data, or events, and/or with one or more other predefined instructions, and collectively form a compound, grouped, or multi-variant data element.

94. The system of claim 93, wherein the at least one interface further enables the buyer-agent computing device to predefine and associate a unique label or code with a compound, grouped, or multi-variant data element, wherein upon identification of the unique label or code, the metric application automatically executes the predefined instructions that are associated with the item.

95. The system of claim 75, wherein the metric application in coordination with the metric manager is programmed to manage at least one interface that enables a buyer-agent computing device to predefine and add a new evaluation service or to modify a predefined evaluation service or to join two or more predefined evaluation services to form a combined evaluation service, and wherein the new, modified, or combined evaluation service is invoked by the metric application when at least one product specification data set is received from the remotely located buyer-agent computing device for the new, modified, or combined evaluation service.

96. The system of claim 75, wherein the metric manager is further programmed to manage predefined instructions that include one or more dynamic or conditional rules, variables, or criteria, including:
one or more formulas operationally combining elements and using variables relating to a plurality of items, parameters, events, databases or metric data sources, synthetic market values, or evaluation metrics;
a combination of rules, variables, or criteria relating to a plurality of items, parameters, events, databases or metric data sources, synthetic market values, or evaluation metrics, the execution of which may be conditional, priority weighted, sequential, recursive, or subject to another prespecified method of control;
a combination of evaluation services, wherein at least one evaluation service is further combined with at least one predefined instruction that specifies employing a process step, action, function, or subroutine, and/or combined with at least one other evaluation service, the execution of which may be conditional, priority weighted, sequential, recursive, or subject to another prespecified method of control; or
one or more validation rules relating to a plurality of items, parameters, events, databases or metric data sources, market transaction data sets, normalized market price data sets, synthetic market values, or evaluation metrics, the execution of which may be conditional, priority weighted, recursive, or subject to another prespecified method of control.

97. The system of claim 75, wherein the metric application in coordination with the metric manager is programmed to manage at least one interface that enables a buyer-agent computing device to predefine for exclusive use by the buyer-agent at least one instruction for adapting metric data or to modify at least one previously predefined instruction for adapting metric data, and to store the at least one predefined or modified instruction for execution when the at least one evaluation service is invoked by the metric application in response to receiving a product specification data set from the buyer-agent computing device.

98. The system of claim 97, wherein one or more of the instructions for adapting metric data predefined or modified by the buyer-agent computing device, when executed, cause the metric application to apply at least one predefined method, formula, or algorithm that was preassociated with a specific item, a specific seller-agent, a specific database or source of metric data, a specific parameter, a specific event, or a combination thereof, to the market reference price data of at least one market transaction data set before generating the at least one synthetic market value for the at least one item identified in the price data set.

99. The system of claim 75, wherein the metric application in coordination with the metric manager is programmed to manage at least one interface that enables a buyer-agent computing device to predefine or preselect one or more methods or algorithms to be applied using the price data of the plurality of normalized market reference price data sets to generate the at least one synthetic market value and to associate the one or more methods or algorithms with at least one evaluation service, and wherein at least one of the predefined or preselected methods or algorithms comprises a replicable mathematical process for determining a mean value, a median value, or variation of a mean or median.

100. The system of claim 75, wherein invocation of the at least one evaluation service and/or execution of one or more predefined instructions that pertain to the at least one evaluation service causes the metric application to generate the at least one synthetic market value for the at least one item identified in the at least one price data set by generating a volume-weighted average value for the item using data values associated with the item in the plurality of normalized market reference data sets.

101. The system of claim 75, wherein the at least one evaluation service or one or more of the predefined instructions associated with the evaluation service specify a temporal function that causes the metric application to automatically generate the at least one synthetic market value and one or more evaluation metrics for the at least one identified item continuously, at a predefined time, over a predefined interval of time, or upon occurrence of a predefined event, wherein an interval of time can include a continuously sliding interval of time that represents a most current period of time.

102. The system of claim 75, wherein execution of at least one predefined instruction that pertains to the at least one evaluation service causes the metric application to automatically query one or more databases or data sources accessible to the processor of the service provider server or to monitor one or more data streams to receive one or more price data sets, wherein each price data set is responsive to attributes of at least one item identified in the product specification data set, includes price data representing an offer, and identifies at least one item that is further defined by one or more parameter values.

103. The system of claim 75, wherein the metric application in coordination with the metric manager is programmed to manage at least one interface that enables the buyer-agent computing device to communicate one or more price data sets responsive to at least one item identified in the product specification data set to the service provider server.

104. The system of claim 75, wherein execution of one or more predefined instructions that pertain to the buyer-agent and the at least one evaluation service causes the metric application in coordination with the metric manager to manage one or more interfaces that enables one or more seller-agents and/or third-party intermediaries to stream or expose without prompting by the service provider server one or more price data sets representing actionable offers to sell one or more identified items, or one or more catalogs or price lists that identify actionable price data for one or more items, via the network interface, to the service provider server.

105. The system of claim 75, wherein execution of at least one predefined instruction that pertains to the buyer-agent and the at least one evaluation service causes the metric application to:
generate at least one request for quote (RFQ) for at least one item identified in the product specification data set, and launch one or more interfaces to communicate the RFQ, via the network interface, to at least one seller-agent computing device on behalf of the buyer-agent, and
receive one or more price data sets responsive to the at least one item identified in the RFQ from at least one seller-agent computing device, via the network interface, wherein each received price data set includes price data representing an offer and identifies at least one item that is defined by one or more parameter values.

106. The system of claim 75, wherein the metric application is further programmed to manage one or more interfaces to facilitate via the service provider server a dynamic negotiation between the buyer-agent computing device and the at least one seller-agent computing device that provided at least one price data set responsive to at least one item identified in the product specification data set, wherein at least one additional price data set is received from the at least one seller-agent computing device via the network interface in response to a counter-offer, wherein the metric application is programmed to automatically generate at least one synthetic market value and one or more evaluation metrics for the at least one item identified in each additional price data set, and to communicate, via the network interface, the at least one additional price data set and the one or more evaluation metrics generated for the at least one item identified in each additional price data set to the remotely located buyer-agent computing device that provided the product specification data set, and wherein the dynamic negotiation continues until a counter-offer is accepted or the dynamic negotiation ceases.

107. The system of claim 106, wherein the metric application is programmed to manage at least one interface to facilitate negotiations, wherein voice communications between the buyer-agent computing device and at least one seller-agent computing device are streamed via the network interface.

108. The system of claim 75, wherein one or more of the parameter values identified with the at least one item in the product specification data set, an obtained market transaction data set, or a received price data set pertain to a grade, a rating measure, a species, an item type, a brand, a quantity, a size, a unit of measure, a tally, a location, a method of delivery, a delivery date, a time of service, a warranty, a payment term, or a transaction type.

109. The system of claim 108, wherein one or more of the parameter values identified with at least one item further comprise a financial delivery.

110. The system of claim 75, wherein the price data associated with at least one item identified in at least one received price data set is expressed as a formula in which the price is to be derived at least in part from one or more specified evaluation metrics, to be generated or reported at one or more times or periods of time in the future.

111. The system of claim 75, wherein execution of one or more predefined instructions that pertain to the at least one evaluation service causes the at least one adjustment value to be generated and applied to the market reference price data associated with the at least one item in one or more of the market transaction data sets that differ by at least one parameter value from the at least one item identified in the price data set, wherein the resulting transformation of the market reference price data occurs independent of unit-of-measure conversion of data in the market transaction data sets defined by a unit-of-measure.

112. The system of claim 75, wherein invocation of the at least one evaluation service and/or execution of one or more predefined instructions that pertain to the at least one evaluation service causes the metric application to generate and apply at least one adjustment value to at least one obtained market transaction data set for each of the one or more parameter values that differ from the at least one item identified in the price data set, wherein the adjustment value serves to minimize a difference between the market transaction data set with the differing parameter and (1) an average of responsive market transaction data sets over the particular period of time, or (2) an average of a control group of market transaction data sets, and wherein the adjustment value is generated using a least squares or similar curve-fit algorithm and applied to the price data associated with the at least one item in the market transaction data set.

113. The system of claim 112, wherein the at least one parameter that differs pertains to a location, and wherein the applied adjustment value generated by the metric application for the differing location parameter is not determined by calculating a point-to-point cost of freight to transport the item from the location identified in the market transaction data set to the location identified in the price data set.

114. The system of claim 75, wherein execution of at least one predefined instruction for adapting metric data that pertains to the at least one evaluation service causes the metric application to generate the at least one synthetic market value for the at least one item in the price data set based, at least in part, on a formula, rule, or correlation that is applied to market transaction price data for at least one other item, wherein the at least one other item is a different item or differs by at least one parameter value from the at least one item identified in the price data set.

115. The system of claim 75, wherein execution of at least one predefined instruction for adapting metric data that pertains to the at least one evaluation service causes the metric application to filter each of the normalized market reference price data sets for inclusion or exclusion using one or more predefined control values, criteria, and/or parameter values, before generating the at least one synthetic market value for the at least one item identified in the price data set.

116. The system of claim 115, wherein execution of at least one predefined instruction that pertains to the at least one evaluation service causes the metric application to filter the market transaction data sets and to use only market transaction data sets that resulted in a purchase or a contract to generate the at least one synthetic market value for the at least one item identified in the price data set.

117. The system of claim 75, wherein execution of at least one predefined instruction that pertains to the at least one evaluation service causes the metric application to rank or sort the plurality of normalized market reference price data sets using one or more predefined control values, criteria, and/or parameter values, and to generate the at least one synthetic market value for the at least one item identified in the price data set using only data associated with a sorted segment or ranked portion of the normalized market reference price data sets.

118. The system of claim 75, wherein invocation of the at least one evaluation service and/or execution of at least one predefined instruction that pertains to the at least one evaluation service causes the metric application to limit the metric data to be obtained to market transaction data sets exposed at a predefined time, over at least one predefined interval of time, or upon occurrence of a predefined event, wherein a predefined interval of time can include a continuously sliding interval of time that represents a most current period of time.

119. The system of claim 75, wherein at least one received price data set identifies a plurality of items that are to be evaluated as a bundled item or wherein at least one item identified in a price data set is a combined item that represents a bundled product, a tally, a list, or an assembly of one or more component parts, wherein the bundled or combined item is offered or sold for a single price, and wherein invocation of the at least one evaluation service and/or execution of one or more predefined instructions that pertain to the at least one evaluation service causes the metric application to:

for each item or component part of the bundled or combined item, obtain metric data from the at least one database or data source, wherein the metric data comprises a plurality of market transaction data sets responsive to attributes of the item or component part, wherein each market transaction data set is defined by at least one parameter value and represents market reference price data associated with at least one item or component part at a particular time or period of time, and wherein at least one item or component part represented in at least one of the plurality of market transaction data sets differs by one or more parameter values from the at least one item or component part of the bundled or combined item;

execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the item or component part represented in the one or more market transaction data sets that differ by at least one parameter value from the bundled or combined item identified in the price data set, transforming the market reference price data associated with the at least one item or component part, and producing a plurality of normalized market reference price data sets for the at least one item or component part of the bundled or combined item;

generate at least one synthetic market value for the at least one item or component part, wherein the market reference price data of the plurality of normalized market reference price data sets are input into at least one predefined algorithm associated with the at least one evaluation service to generate the at least one synthetic market value for the at least one item or component part; and generate one or more evaluation metrics for one or more items or component parts of the bundled or combined item identified in the price data set based at least in part on the synthetic market values, wherein at least one evaluation metric is a combined evaluation metric generated at least in part by summing the synthetic market values for the plurality of items or component parts of the bundled or combined item identified in the price data set, and wherein the metric application is further programmed to manage at least one interface to communicate, via the network interface, the at least one price data set and the corresponding one or more evaluation metrics to at least the remotely located buyer-agent computing device from which the product specification data set was received.

120. The system of claim 119, wherein invocation of the at least one evaluation service and/or execution of one or more predefined instructions that pertain to the at least one evaluation service causes the metric application to generate at least one evaluation metric for the bundled or combined item identified in the price data set under multiple evaluation scenarios, wherein at least one evaluation scenario references an alternate item or component part, alternate parameter, alternate period of time, alternate database or metric data source, or combination thereof, or wherein at least one evaluation scenario causes the metric application to filter the normalized market reference price data sets using alternate criteria and/or evaluation parameters before generating the at least one synthetic market value for the bundled or combined item, wherein the at least one evaluation metric generated for the bundled or combined item under the multiple evaluation scenarios are compared, and wherein the metric application is further programmed to manage at least one interface to communicate a result of the comparison, via the network interface, to at least the remotely located buyer-agent computing device from which the product specification data set was received.

121. The system of claim 75, wherein at least one received price data set identifies a plurality of items that are to be evaluated as a bundled item or wherein at least one item identified in a price data set is a combined item that represents a bundled product, a tally, a list, or an assembly of one or more component parts, wherein the bundled or combined item is offered or sold for a single price, and wherein invocation of the at least one evaluation service and/or execution of one or more predefined instructions that pertain to the at least one evaluation service causes the metric application to disaggregate the single price of the bundled or combined item into a plurality of items or component parts and price data values associated with each item or component part, wherein the metric application is caused to:

for each item or component part of the bundled or combined item, obtain metric data from the at least one database or data source, wherein the metric data comprises a plurality of market transaction data sets responsive to attributes of the item or component part in the price data set, wherein each market transaction data set is defined by at least one parameter value and represents market reference price data associated with at least one item or component part at a particular time or period of time, and wherein at least one item or component part represented in the plurality of market transaction data sets differs by one or more parameter values from the at least one item or component part of the bundled or combined item identified in the price data set;

execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the item or component part represented in the one or more market transaction data sets that differ by at least one parameter value from the bundled or combined item identified in the price data set, transforming the market reference price data associated with the at least one item or component part, and producing a plurality of normalized market reference price data sets for the at least one item or component part of the bundled or combined item;

generate at least one synthetic market value for the at least one item or component part, wherein the market reference price data of the plurality of normalized market reference price data sets are input into at least one predefined algorithm associated with the at least one evaluation service to generate the at least one synthetic market value for the at least one item or component part identified in the price data set;

multiply the at least one synthetic market value for each item or component part by a quantity value identified for each item or component part in the price data set, producing a component market value total for each item or component part;

sum the component market value totals for the items or component parts of the bundled or combined item, thereby generating a synthetic market value total for the bundled or combined item identified in the price data set; and generate a price data value to be associated with at least one item or component part of the bundled or combined item by dividing the synthetic market value generated for the at least one item or component part by the synthetic market value total generated for the bundled or combined item, producing a ratio or percent that the at least one item or component part represents of the bundled or combined item, and multiply the single price for the bundled or combined item identified in the price data set by the ratio or percent the at least one item or component part represents of the bundled or combined item to generate the price data value for the at least one item or component part, wherein the metric application is further programmed to manage at least one interface to communicate, via the network interface, the price data value generated for the at least one item or component part of the bundled or combined item to at least the remotely located buyer-agent computing device from which the product specification data set was received.

122. The system of claim 121, wherein invocation of the at least one evaluation service and/or execution of one or more predefined instructions that pertain to the at least one evaluation service causes the metric application to compare the price data value generated for the at least one item or component part of the bundled or combined item to the at least one synthetic market value generated for the at least one item or component part of the bundled or combined item identified in each price data set, generating at least one comparative metric.

123. The system of claim 121, further comprising comparing a plurality of price data sets that identify the bundled or combined item, wherein invocation of the at least one evaluation service and/or execution of one or more predefined instructions that pertain to the at least one evaluation service causes the metric application to divide the price data value generated for the at least one item or component part of the bundled or combined item by the at least one synthetic market value generated for the at least one item or component part of the bundled or combined item to generate a relative value metric for the at least one item or component part as identified in each price data set, and wherein the relative value metric generated for the at least one item or component part provides an objective measure with which to compare the at least one item or component part across a plurality of price data sets possessing unequal parameters.

124. The system of claim 75, wherein each price data set includes a quantity value for the at least one item identified in the price data set and the normalized market reference price data sets comprise a normalized value per unit for the at least one item, wherein generating the at least one synthetic market value for the at least one item comprises generating a synthetic market value per unit for the item that is multiplied by the quantity value for the at least one item identified in the price data set, and wherein the at least one evaluation metric generated for the at least one item comprises a comparable quantity for the at least one item identified in the price data set.

125. The system of claim 75, wherein invocation of the at least one evaluation service and/or execution of one or more predefined instructions that pertain to the at least one evaluation service causes the metric application to consistently convert data expressed in units of measure into at least one of the following:
 (1) standardized or common units of measure;
 (2) units of measure specified in the one or more predefined instructions; or
 (3) units of measure specified for the at least one item in the product specification data set,
 and to only generate the at least one synthetic market value for the at least one item identified in the price data set using data possessing consistent units of measure.

126. The system of claim 75, wherein the metric application is further programmed to manage at least one interface that facilitates an integrated data exchange between the processor of the service provider server and at least one application running on a remotely located buyer-agent computing device and/or facilitates an integrated data exchange with at least one other computing device in communication with the service provider server via the network interface, and to execute movement of data in an integrated data exchange.

127. The system of claim 75, wherein invocation of the at least one evaluation service and/or execution one or more predefined instructions that pertain to the at least one evaluation service causes the metric application to automatically query one or more databases or data sources accessible to the processor of the service provider server or to monitor one or more data streams to obtain at least one market transaction data set responsive to attributes of the at least one item identified in one or more of the price data sets, and wherein the querying or monitoring occurs continuously, at a predefined time, over at least one predefined interval of time, or upon occurrence of a predefined event.

128. The system of claim 75, wherein invocation of the at least one evaluation service and/or execution of one or more predefined instructions that pertain to the at least one evaluation service causes the metric application to apply one or more predefined validation rules and/or statistical criteria that must be satisfied by (1) each obtained market transaction data set or each normalized market reference price data set, and/or (2) the at least one synthetic market value generated from the normalized market reference price data sets, before the one or more evaluation metrics are generated for the at least one item identified in the price data set.

129. The system of claim 128, wherein each of the plurality of normalized market reference price data sets is determined to satisfy the one or more predefined validation rules and/or statistical criteria and is used, or is determined to not satisfy the one or more predefined validation rules and/or statistical criteria and is excluded from use before generating the at least one synthetic market value.

130. The system of claim 75, wherein invocation of the at least one evaluation service and/or execution of one or more predefined instructions that pertain to the at least one evaluation service causes the metric application to evaluate the data of the plurality of normalized market reference price data sets for collective satisfaction of one or more predefined validation rules and/or statistical criteria before generating the at least one synthetic market value for the at least one item identified in the price data set, wherein the one or more predefined validation rules and/or statistical criteria consider at least one of: total volume in units per item per period of time specified; frequency/liquidity of the market transaction data sets; concentration/fragmentation of the market transaction data sets by source of the transaction data; or concentration/fragmentation of the market transaction data sets by the type of transaction.

131. The system of claim 75, wherein invocation of the at least one evaluation service and/or execution of one or more predefined instructions that pertain to the at least one evaluation service causes the metric application to apply at least one predefined validation rule and/or statistical criteria that must be satisfied before generating the one or more evaluation metrics for the at least one item identified in the price data set, and further causes the metric application to measure a deviation of the at least one synthetic market value generated for the at least one item from a previously-generated synthetic market value or a predefined base market value for the at least one item, wherein exceeding a predefined threshold deviation from the previously-generated synthetic market value or the predefined base market value for the at least one item causes the metric application to regenerate the synthetic market value using the same and/or at least one preselected alternate evaluation service before generating the one or more evaluation metrics for the at least one item, and/or to determine based on the at least one predefined validation rule or statistical criteria whether to invalidate the at least one synthetic market value or to generate an alert or to flag at least one evaluation metric generated based at least in part on the at least one synthetic market value as falling outside the predefined threshold deviation when communicating, via the network interface, the one or more evaluation metrics to at least the remotely located buyer-agent computing device from which the product specification data set was received.

132. The system of claim 75, wherein invocation of the at least one evaluation service and/or execution of one or more predefined instructions that pertain to the at least one evaluation service causes the metric application to automatically update the one or more evaluation metrics previously generated for the at least one item identified in the price data set, continuously, at a predefined time, over a predefined interval of time, or upon occurrence of a predefined event, wherein said causing the metric application to automatically update the one or more evaluation metrics comprises causing the metric application to:
 obtain more-current metric data from at least one database or data source accessible to the processor, wherein the more-current metric data comprises an updated plurality of market transaction data sets responsive to attributes of the at least one item identified in the price data set, wherein the updated plurality of market transaction data set includes at least one more-current market transaction data set or excludes at least one previously-obtained market transaction data set that is no longer responsive to the at least one item or no longer represents market reference price data associated with the at least one item at a particular time or period of time;

execute the one or more predefined instructions for adapting metric data that pertain to the at least one evaluation service as applicable to each of the market transaction data sets in the updated plurality of market transaction data sets, wherein execution of the one or more predefined instructions causes at least one adjustment value to be generated and applied to the market reference price data associated with the at least one item represented in the one or more market transaction data sets that differ by at least one parameter value from the at least one item identified in the price data set, transforming the market reference price data associated with the at least one item, and producing a plurality of more-current normalized market reference price data sets for the at least one item;

generate at least one updated synthetic market value for the at least one item, wherein the market reference price data of the plurality of more-current normalized market reference price data sets are input into the at least one predefined algorithm associated with the at least one evaluation service to generate the at least one updated synthetic market value; and generate one or more updated evaluation metrics for the at least one item identified in the price data set based at least in part on the at least one updated synthetic market value, wherein the metric application is further program to manage at least one interface to communicate, via the network interface, the one or more updated evaluation metrics to at least the remotely located buyer-agent computing device from which the product specification data set was received.

133. The system of claim 132, wherein invocation of the at least one evaluation service and/or execution of one or more predefined instructions that pertain to the at least one evaluation service causes the metric application to update the at least one synthetic market value of the at least one item and/or the one or more evaluation metrics based at least in part on the synthetic market value in real-time or near real-time.

134. The system of claim 132, wherein invocation of the at least one evaluation service and/or execution of one or more predefined instructions that pertain to the at least one evaluation service causes the metric application to compare the price data for the at least one item identified in the at least one price data set to the at least one updated synthetic market value generated for the at least one item.

135. The system of claim 132, wherein at least one of the evaluation metrics is a comparative metric, wherein invocation of the at least one evaluation service and/or execution of one or more predefined instructions that pertain to the at least one evaluation service causes the metric application to compare the one or more updated evaluation metrics for the at least one item to one or more previously-generated evaluation metrics for the at least one item, a predefined base market value, or one or more third-party reported market values for the at least one item, to generate at least one comparative metric for the at least one item and to manage at least one interface to communicate the comparative metric to at least the remotely located buyer-agent computing device.

136. The system of claim 135, wherein the metric application is programmed to manage one or more visual interfaces to communicate the at least one comparative metric to the remotely located buyer-agent computing device for visual display in the form of a table, chart, or graph, and wherein the metric application is programmed to manage multiple visual interfaces that can be alternatively or simultaneously displayed, wherein the multiple visual interfaces facilitate interactions that enable a buyer-agent to expose underlying data in one or more layers of detail, or to display additional linked information or the same data presented in a different format or as determined over a different period of time.

137. The system of claim 132, wherein invocation of the at least one evaluation service and/or execution of one or more predefined instructions that pertain to the at least one evaluation service further causes the metric application to automatically generate updated price data for at least one item identified in a previously-received price data set, wherein the price data associated with the at least one item in the price data set was predefined as a formula and/or specified to be derived at least in part using the one or more updated evaluation metrics.

138. The system of claim 75, wherein the metric application in coordination with the metric manager is further programmed to impute one or more item attributes, parameters, or associations using one or more mathematical or statistical processes applied using at least one known item, attribute, parameter identified in the price data set, or one or more instructions previously received from the remotely located buyer-agent computing device.

139. The system of claim 75, wherein execution of one or more instructions that pertain to the at least one evaluation service cause the metric application to:

obtain metric data from at least one database or data source accessible to the processor, wherein the metric data comprises a plurality of market transaction data sets representing market reference price data responsive to at least one alternate item, wherein the alternate item is a substitute item or an item with at least one differing parameter value from that of the at least one item identified in the price data set;

execute the one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the at least one alternate item in the plurality of market transaction data sets, transforming the market reference price data associated with the at least one alternate item and producing a plurality of normalized market reference price data sets for the at least one item identified in the price data set;

generate at least one synthetic market value for the at least one item identified in the price data set, wherein the market reference price data of the plurality of normalized market price data sets are input into at least one predefined algorithm associated with the at least one evaluation service to generate the at least one synthetic market value for the at least one item using normalized market reference price data for the at least one alternate item; and generate one or more evaluation metrics based at least in part on the at least one synthetic market value, wherein at least one evaluation metric compares the price data associated with the at least one item identified in the price data set to the at least one synthetic market value for the at least one alternate item.

140. The system of claim 75, wherein invocation of the at least one evaluation service and/or execution of one or more predefined instructions that pertain to the at least one evaluation service causes the metric application, to expose to at least one tracking system, at least a subset of the data received or generated by the service provider server responsive to the at least one item identified in the at least one product specification data set and/or one or more received price data sets.

141. The system of claim 75, wherein the metric application is further programmed to coordinate execution of subroutines of the at least one evaluation service and/or multiple evaluation services, in parallel, in combination, or sequentially.

142. The system of claim 75, wherein invocation of the at least one evaluation service and/or execution of one or more predefined instructions that pertain to the at least one evaluation service causes the metric application to obtain only metric data resulting from a computer-based interaction and comprising electronically created market transaction data sets.

143. The system of claim 142, wherein the market reference price data further does not include human-reported transaction data or transaction data that was manually transcribed into a digital format.

144. The system of claim 75, wherein invocation of the at least one evaluation service and/or execution of one or more predefined instructions that pertain to the at least one evaluation service causes the metric application to manage at least one interface to facilitate data communication in XML format, wherein the metric application is able to dynamically change, dynamically route, and/or pre-configure the data for movement of the data in an integrated data exchange.

145. The system of claim 75, wherein the metric application is programmed to manage at least one interface that enables the remotely located buyer-agent to trigger an event that causes the metric application to manage an interface wherein the buyer-agent computing device is prompted to identify or select at least one data element or function to be added to a currently in-progress evaluation service or to remove a data element or function from the currently in-progress evaluation service, modifying at least one evaluation service currently in-progress for at least one item identified in the at least one received price data set.

146. The system of claim 75, wherein the obtained metric data was automatically exposed, via the network interface, to the processor by the at least one database or data source, wherein the exposing occurred without prompting by the processor.

147. The system of claim 75, wherein the one or more evaluation metrics are generated without using a predictive model, wherein the data values associated with the at least one item identified in the price data set are not input into a pre-constructed model that produces a predictable outcome.

148. The system of claim 75, wherein one or more of the evaluation metrics are generated for the at least one item without regard to the price data associated with the at least one item in any of the plurality of price data sets and without comparing the data values identified in one price data set to the data values identified in another price data set.

149. The system of claim 75, wherein one or more of the evaluation metrics are generated for the at least one item without regard to a price the buyer-agent last paid for the at least one item and without identifying the buyer-agent's prior transaction data related to the at least one item identified in the price data set.

150. In a networked service provider environment, a computing system comprising:
  a service provider server comprising:
    a network interface;
    a memory storing computer-readable instructions; and
    a processor in communication with the network interface and the memory, wherein the processor is configured to execute the computer-readable instructions stored in the memory;
  a metric manager executable by the processor, wherein the metric manager is programmed to manage at least one evaluation service and a plurality of predefined instructions for adapting metric data; and
  a metric application operable in coordination with the metric manager, wherein the metric application is programmed to coordinate invocation of the at least one evaluation service including execution of one or more predefined instructions for adapting metric data that pertain to a buyer-agent and the at least one evaluation service, and to manage one or more interfaces that facilitate communications with the service provider server,
  wherein the metric application is further programmed to:
    receive, from a buyer-agent via a remotely located buyer-agent computing device, one or more product specification data sets, wherein each product specification data set identifies at least one item that is defined by two or more parameter values, or a plurality of items that differ in accordance with at least one parameter value;
    receive one or more price data sets responsive to at least one item identified in the product specification data sets, wherein each price data set includes price data representing an offer and identifies at least one item that is defined by one or more parameter values; and
    for at least one item identified in at least one product specification data set and identified in at least one responsive price data set, invoke the at least one evaluation service to automatically generate one or more evaluation metrics for the item identified in the product specification data set, wherein invoking the at least one evaluation service causes the metric application to:
      obtain metric data from at least one database or data source accessible to the processor, wherein the metric data comprises a plurality of market transaction data sets responsive to attributes of the at least one item identified in the product specification data set, wherein each market transaction data set is defined by at least one parameter value and represents market reference price data associated with the at least one item at a particular time or period of time, and wherein at least one item represented in the plurality of market transaction data sets differs by one or more parameter values from the at least one item identified in the product specification data set;
      execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the at least one item as represented in one or more of the market transaction data sets that differ by at least one parameter value from the at least one item identified in the product specification data set, transforming the market reference price data associated with the at least one item and producing a plurality of normalized market reference price data sets for the at least one item identified in the product specification data set; and generate at least one synthetic market value for the at least one item identified in the product specification data set, wherein the market reference price data of the plurality of normalized market reference price data sets are input into at least one predefined algorithm associated with the at least one evaluation service to generate the at least one synthetic market value, and generate one or more evaluation metrics for the at least one item identified in the product specification data set based at least in part on the at least one synthetic market value, wherein the metric application is further programmed to:

for at least one item identified in the at least one product specification data set and identified in the at least one responsive price data set, invoke the at least one evaluation service to automatically generate one or more evaluation metrics for the item identified in the price data set, wherein invoking the at least one evaluation service causes the metric application to:

obtain metric data from at least one database or data source accessible to the processor, wherein the metric data comprises a plurality of market transaction data sets responsive to attributes of the at least one item identified in the price data set, wherein each market transaction data set is defined by at least one parameter value and represents market reference price data associated with the at least one item at a particular time or period of time, and wherein at least one item represented in the plurality of market transaction data sets differs by one or more parameter values from the at least one item identified in the price data set;

execute one or more predefined instructions for adapting metric data that pertain to the at least one evaluation service, as applicable to each of the market transaction data sets, wherein execution of the one or more predefined instructions causes at least one adjustment value to be generated and applied to the market reference price data associated with the at least one item as represented in one or more of the market transaction data sets that differ by at least one parameter value from the at least one item identified in the price data set, transforming the market reference price data associated with the at least one item and producing a plurality of normalized market reference price data sets for the at least one item identified in the price data set;

generate at least one synthetic market value for the at least one item identified in the price data set, wherein the market reference price data of the plurality of normalized market reference price data sets are input into at least one predefined algorithm associated with the at least one evaluation service to generate the at least one synthetic market value and generate one or more evaluation metrics for the at least one item identified in the price data set based at least in part on the at least one synthetic market value; and generate one or more evaluation metrics for at least one item identified in the at least one product specification data set and identified in the at least one received price data set, wherein at least one of the evaluation metrics is a comparative metric that compares the price data for the at least one item in the price data set and/or the one or more evaluation metrics generated for the at least one item in the price data set with the one or more evaluation metrics generated for the respective item identified in the product specification data set, wherein the metric application is further programmed to manage at least one interface to communicate, via the network interface, at least a subset of the one or more received price data sets and the one or more evaluation metrics generated for the at least one item in each price data set to at least the remotely located buyer-agent computing device from which the product specification data set was received.

151. The system of claim 150, wherein the metric application receives a plurality of price data sets and invocation of the at least one evaluation service and/or execution of one or more predefined instructions that pertain to the at least one evaluation service causes the metric application to compare two or more received price data sets, wherein the price data sets are ranked or grouped by the at least one comparative metric generated for the at least one item in each price data set.

152. The system of claim 150, wherein the product specification data set and the at least one price data set include a quantity value for the at least one item and the normalized market reference price data sets comprise a normalized value per unit for the at least one item, and wherein generating at least one synthetic market value for the at least one item comprises generating a synthetic market value per unit for the at least one item and multiplying the synthetic market value per unit for the item by the quantity value for the at least one item.

153. The system of claim 150, wherein invocation of the at least one evaluation service and/or execution of one or more predefined instructions that pertain to the at least one evaluation service causes the metric application to generate a relative value metric for the at least one item identified in at least one received price data set wherein the price data for the at least one item identified in the at least one price data set is divided by the at least one synthetic market value generated for the at least one item identified in the price data set, producing a ratio or index value.

154. The system of claim 153, wherein invocation of the at least one evaluation service and/or execution of one or more predefined instructions that pertain to the at least one evaluation service causes the metric application to compare two or more received price data sets, wherein the two or more price data sets are ranked or grouped by the relative value metric generated for the at least one item identified in each price data set.

155. The system of claim 154, wherein execution of one or more predefined instructions predefined by the buyer-agent computing device that pertain to the at least one evaluation service causes the metric application to automatically transmit on behalf of the buyer-agent at least one purchase notice to at least one remotely located seller-agent computing device providing at least one price data set with a lowest relative value metric for the at least one item identified in the product specification data set.

156. The system of claim 150, wherein the metric application is further programmed to manage at least one interface that facilitates an integrated data exchange between the processor of the service provider server and at least one application running on the at least one remotely located seller-agent computing device in communication with the service provider server via the network interface, and to automatically execute movement of the purchase notice in an integrated data exchange.

157. The system of claim 153, wherein the metric application receives a plurality of price data sets, wherein at least one item identified in one or more of the responsive price data sets is not a perfect substitute for the same item identified in another price data set in that the item varies by one or more parameter values from the item identified in another price data set, and wherein the relative value metric generated for the at least one item identified in each price data set provides an objective measure with which to compare the at least one item across the plurality of price data sets, including the one or more price data sets possessing unequal parameters.

158. The system of claim 150, wherein invocation of the at least one evaluation service and/or execution of one or more predefined instructions that pertain to the at least one evaluation service causes the metric application to generate a comparative metric for the at least one item in the price data set in which at least one of the one or more evaluation metrics generated for the at least one item identified in the at least one price data set is divided by at least one of the one or more evaluation metrics generated for the at least one item identified in the product specification data set, producing a ratio or index value.

159. The system of claim 150, wherein invocation of the at least one evaluation service and/or execution of one or more predefined instructions that pertain to the at least one evaluation service causes the metric application to generate a comparative metric for the at least one item in the price data set in which the price data for the at least one item identified in the at least one price data set is divided by at least one synthetic market value generated for the at least one item in the product specification data set, producing a ratio or index value.

160. The system of claim 150, wherein the at least one synthetic market value and/or the one or more evaluation metrics generated based at least in part of the at least one synthetic market value for the at least one item identified in the product specification data set and/or the at least one received price data set are further used by the metric application in one or more subsequent evaluation services.

161. The system of claim 150, wherein the at least one evaluation service is predefined and stored in the memory, and invoked by the metric application in response to receiving, from the remotely located buyer-agent computing device, a product specification data set identifying at least one item for the at least one evaluation service.

162. The system of claim 150, wherein the metric application is programmed to manage one or more visual interfaces to communicate the one or more evaluation metrics to the remotely located buyer agent computing device for visual display in the form of a table, chart, or graph, wherein the metric application is programmed to manage multiple visual interfaces that can alternatively or simultaneously be displayed, and wherein the multiple visual interfaces facilitate interactions enable a buyer-agent to expose underlying data in one or more layers of detail, or to display linked information or the same data presented in a different format or as determined over a different period of time.

163. The system of claim 150, wherein the metric application in coordination with the metric manager is programmed to manage at least one interface that enables a buyer-agent computing device to predefine and associate one or more instructions for adapting metric data with a specific item, a specific database or source of metric data, a specific seller-agent, a specific parameter, and/or a specific event.

164. The system of claim 163, wherein the at least one interface further enables the buyer-agent computing device to predefine and associate a unique label or code with a specific item, wherein upon identification of the unique label or code, the metric application automatically executes the one or more predefined instructions that are associated with the item.

165. The system of claim 150, wherein the metric application in coordination with the metric manager is programmed to manage at least one interface that enables a buyer-agent computing device to predefine and add a new evaluation service or to modify a predefined evaluation service or to join two or more predefined evaluation services to form a combined evaluation service, and wherein the new, modified, or combined evaluation service is invoked by the metric application when at least one product specification data set is received from the remotely located buyer-agent computing device for the new, modified, or combined evaluation service.

166. The system of claim 150, wherein the metric manager is further programmed to manage one or more dynamic or conditional rules, variables, or criteria, including:
   one or more formulas operationally combining elements and using variables relating to a plurality of items, parameters, events, databases or metric data sources, synthetic market values, or evaluation metrics;
   a combination of rules, variables, or criteria relating to a plurality of items, parameters, events, databases or metric data sources, synthetic market values, or evaluation metrics, the execution of which may be conditional, priority weighted, sequential, recursive, or another prespecified method of control;
   a combination of evaluation services, wherein at least one evaluation service is combined with at least one predefined instruction that specifies employing a process, step, action, function or subroutine, and/or combined with at least one other evaluation service, the execution of which may be conditional, priority weighted, sequential, recursive, or another prespecified method of control; or
   one or more validation rules relating to a plurality of items, parameters, events, databases or metric data sources, market transaction data sets, normalized market price data sets, synthetic market values, or evaluation metrics, the execution of which may be conditional, priority weighted, recursive, or other prespecified method of control.

167. The system of claim 150, wherein the metric application in coordination with the metric manager is programmed to manage at least one interface that enables a buyer-agent computing device to predefine for exclusive use by the buyer-agent at least one instruction for adapting metric data or to modify at least one previously predefined instruction for adapting metric data, and to store the at least one predefined or modified instruction until executed when the at least one evaluation service is invoked by the metric application in response to receiving a product specification data set from the buyer-agent computing device.

168. The system of claim 150, wherein the metric application in coordination with the metric manager is programmed to manage at least one interface that enables a buyer-agent computing device to predefine or preselect one or more methods or algorithms to be applied using the price data of the plurality of normalized market reference price data sets to generate the at least one synthetic market value and to associate the one or more methods or algorithms with at least one evaluation service, and wherein at least one of the predefined or preselected methods or algorithms comprises a replicable mathematical process for determining a mean value, a median value, or variation of a mean or median.

169. The system of claim 150, wherein the market transaction data sets include market reference price data that was exposed by at least one buyer agent or at least one seller agent.

170. The system of claim 150, wherein invocation of the at least one evaluation service and/or execution of one or more predefined instructions that pertain to the at least one evaluation service causes the metric application to automatically query one or more databases or data sources accessible to the processor of the service provider server or to monitor one or more data streams to obtain at least one market transaction data set responsive to attributes of at least one item identified in the product specification data set and/or responsive to attributes of the at least one item identified in the one or more received price data sets, and wherein the querying or monitoring occurs continuously, at a predefined time, over at least one predefined interval of time, or upon occurrence of a predefined event.

171. The system of claim 150, wherein the metric application is further programmed invocation of the at least one evaluation service and/or execution of one or more predefined instructions that pertain to the at least one evaluation service causes the metric application to generate and apply at least one adjustment value responsive to each parameter that differs from the at least one item identified in the product specification data set or identified in a received price data set, wherein the adjustment value serves to minimize a difference between the market transaction data set with the differing parameter and (1) an average of responsive market transaction data sets over the particular period of time, or (2) an average of a control group of market transaction data sets, and wherein the adjustment value is generated using a least squares or similar curve-fit algorithm and applied to the price data associated with the at least one item in the market transaction data set.

172. The system of claim 150, wherein execution of at least one predefined instruction for adapting metric data that pertains to the at least one evaluation service causes the metric application to generate the at least one synthetic market value for the at least one item identified in the product specification data set or at least one price data set based, at least in part, on a formula, rule, or correlation that is applied to market transaction price data for at least one other item, wherein the at least one other item is a different item or differs by at least one parameter value from the at least one item identified in the product specification data set or the at least one price data set.

173. The system of claim 150, wherein invocation of the at least one evaluation service and/or execution of one or more predefined instructions that pertain to the at least one evaluation service causes the metric application to apply one or more predefined predetermined validation rules and/or statistical criteria that must be satisfied by (1) the obtained market transaction data sets or the normalized market reference price data sets, and/or (2) the at least one synthetic market value generated from the price data of the plurality of normalized market reference price data sets, before the one or more evaluation metrics are generated for the at least one item identified in the product specification data set and/or at least one price data set.

174. The system of claim 150, wherein invocation of the at least one evaluation service and/or execution of one or more predefined instructions that pertain to the at least one evaluation service causes the metric application to automatically update the one or more evaluation metrics previously generated for the at least one item identified in the at least one product specification data set or identified in at least one received price data set, continuously, at a predefined time, over a predefined interval of time, or upon occurrence of a predefined event, wherein said causing the metric application to automatically update the one or more evaluation metrics comprises causing the metric application to:

obtain more-current metric data from at least one database or data source accessible to the processor, wherein the more-current data comprises an updated plurality of market transaction data sets responsive to the at least one item, wherein the updated plurality of market transaction data sets includes at least one more-current market transaction data set or excludes at least one previously-obtained market transaction data set that is no longer responsive to the at least one item or no longer represents market reference price data associated with the at least one item at a particular time or period of time;

execute the one or more predefined instructions for adapting metric data that pertain to the at least one evaluation service, as applicable to each of the one or more market transaction data sets in the updated plurality of market transaction data sets, wherein execution of the one or more predefined instructions causes at least one adjustment value to be generated and applied to the market reference price data associated with at least one item represented in one or more of the market transaction data sets that differ by at least one parameter value from the at least one item identified in the product specification data set, transforming the market reference price data and producing a plurality of more-current normalized market reference price data sets responsive to the at least one item;

generate at least one updated synthetic market value for the at least one item, wherein the market reference price data associated with the plurality of more-current normalized market reference price data sets are input into at least one predefined algorithm associated with the at least one evaluation service to generate the at least one updated synthetic market value; and generate one or more updated evaluation metrics for the at least one item identified in the at least one product specification data set or identified in the at least one received price data set based at least in part on the at least one updated synthetic market value, wherein the metric application is further programmed to manage at least one interface to communicate, via the network interface, the one or more updated evaluation metrics to at least the remotely located buyer-agent computing device.

175. The system of claim 174, wherein invocation of the at least one evaluation service and/or execution of one or more predefined instructions that pertain to the at least one evaluation service causes the metric application to apply one or more predefined validation rules and/or statistical criteria that must be satisfied before generating the at least one updated synthetic market value and/or the one or more updated evaluation metrics for the at least one item identified in the product specification data set and/or identified in at least one price data set.

176. The system of claim 150, wherein at least one predefined instruction that pertains to the at least one evaluation service further causes the metric application to regenerate the at least one comparative metric using one or more updated evaluation metrics generated for the at least one item identified in the at least one product specification data set and/or identified in at least one price data set.

177. The system of claim 150, wherein invocation of the at least one evaluation service and/or execution of the one or more predefined instructions that pertain to the at least one evaluation service causes the metric application to apply at least one predefined validation rule and/or statistical criteria that must be satisfied before the one or more evaluation metrics are generated for the at least one item, and further causes the metric application to measure a deviation of the at least one synthetic market value generated for the at least one item at least one previously-generated synthetic market value or a predefined base market value for the at least one item, wherein exceeding a predefined threshold deviation from the previously-generated synthetic market value or the predefined base market value for the at least one item causes the metric application to regenerate the synthetic market value using the same and/or at least one preselected alternate evaluation service before generating the one or more evaluation metrics for the at least one item, and/or to determine based on the at least one predefined validation rule or statistical criteria whether to invalidate the at least one synthetic market value or to generate an alert or to flag the one or more evaluation metrics generated based at least in part on the at least one synthetic market value as falling outside the predefined threshold deviation when communicating, via the network interface, the one or more evaluation metrics for the at least one item identified in the product specification data set and/or identified in at least one price data set to at least the remotely located buyer-agent computing device from which the product specification data set was received.

178. The system of claim 150, wherein execution of at least one predefined instruction for adapting metric data that pertains to the at least one evaluation service causes the metric application to filter each of the normalized market reference price data sets for inclusion or exclusion using one or more predefined control values, criteria, and/or parameter values identified in at least one of the predefined instructions, before generating the at least one synthetic market value for the at least one item identified in the product specification data set and/or identified in a received price data set.

179. The system of claim 150, wherein invocation of the at least one evaluation service and/or execution of one or more predefined instructions that pertain to the at least one evaluation service causes the metric application to expose to at least one tracking system, at least a subset of the data received or generated by the service provider server responsive to the at least one item identified in the at least one product specification data set and/or identified in a received price data set.

180. The system of claim 150, wherein the metric application is programmed to coordinate invocation of subroutines of the at least one evaluation service and/or multiple evaluation services, in parallel, in combination, or sequentially.

181. The system of claim 150, wherein invocation of the at least one evaluation service and/or execution of one or more predefined instructions that pertain to the at least one evaluation service causes the metric application to obtain only metric data resulting from a computer-based interaction and comprising electronically created market transaction data sets.

182. The system of claim 181, wherein the price data further does not include human-reported transaction data or transaction data that was manually transcribed into a digital format.

183. The system of claim 150, wherein invocation of the at least one evaluation service and/or execution of one or more predefined instructions that pertain to the at least one evaluation service causes the metric application to manage at least one interface to facilitate data communication in XML format, wherein the metric application is able to dynamically change, dynamically route, and/or pre-configure the data for movement of the data in an integrated data exchange.

184. The system of claim 150, wherein execution of at least one predefined instruction that pertains to the at least one evaluation service causes the metric application to automatically query one or more databases or data sources accessible to the processor of the service provider server or to monitor one or more data streams to receive one or more price data sets, wherein each price data set is responsive to attributes of at least one item identified in the product specification data set and is further defined by at least one or more parameter values, to automatically generate at least one synthetic market value for the at least one item identified in each received price data set, and to generate at least one evaluation metric for the at least one item based at least in part on the synthetic market value, and wherein the price data associated with the at least one item identified in each of the one or more received price data sets is automatically compared to at least one evaluation metric generated for the at least one item, producing at least one comparison value.

185. The system of claim 150, wherein one or more of the parameter values identified with the at least one item in the product specification data set, an obtained market transaction data set, or a received price data set pertain to a grade, a rating measure, a species, an item type, a brand, a quantity, a size, a unit of measure, a tally, a location, a method of delivery, a delivery date, a time of service, a warranty, a payment term, or a transaction type.

186. The system of claim 150, wherein the obtained metric data was automatically exposed, via the network interface, to the processor by the at least one database or data source, wherein the exposing occurred without prompting by the processor.

* * * * *